(12) United States Patent
Maree

(10) Patent No.: US 12,054,403 B2
(45) Date of Patent: Aug. 6, 2024

(54) TREATMENT OF WATER

(71) Applicant: ROC WATER TECHNOLOGIES (PTY) LTD, Pretoria (ZA)

(72) Inventor: Johannes Philippus Maree, Pretoria (ZA)

(73) Assignee: ROC WATER TECHNOLOGIES (PTY) LTD, Pretoria (ZA)

( * ) Notice: Subject to any disclaimer, the term of this patent is extended or adjusted under 35 U.S.C. 154(b) by 560 days.

(21) Appl. No.: 17/027,873

(22) Filed: Sep. 22, 2020

(65) Prior Publication Data

US 2022/0089462 A1 Mar. 24, 2022

(51) Int. Cl.
| | | |
|---|---|---|
| C02F 1/22 | (2023.01) | |
| B01D 9/00 | (2006.01) | |
| B01D 61/02 | (2006.01) | |
| C02F 1/44 | (2023.01) | |
| C02F 101/10 | (2006.01) | |
| C02F 103/10 | (2006.01) | |

(52) U.S. Cl.
CPC .............. C02F 1/22 (2013.01); B01D 9/0013 (2013.01); B01D 61/025 (2013.01); C02F 1/441 (2013.01); B01D 2317/02 (2013.01); C02F 2101/10 (2013.01); C02F 2103/10 (2013.01)

(58) Field of Classification Search
CPC .... C02F 1/22; C02F 1/441; C02F 1/66; C02F 2101/10; C02F 2103/10; B01D 2311/04; B01D 2317/02; B01D 61/025; B01D 9/0013; B01D 9/0036; B01D 9/0059; B01D 61/026; B01D 61/2023; B01D 61/2024
See application file for complete search history.

(56) References Cited

U.S. PATENT DOCUMENTS

| | | | | |
|---|---|---|---|---|
| 3,250,081 | A * | 5/1966 | Othmer | C02F 1/22 62/535 |
| 3,893,507 | A * | 7/1975 | MacCracken | F25C 3/02 62/235 |
| 4,468,930 | A * | 9/1984 | Johnson | F28G 1/125 165/95 |
| 2019/0352194 | A1* | 11/2019 | Thiers | C02F 1/442 |

OTHER PUBLICATIONS

Sakhri et al., Effect of the pipe material and burying depth on the thermal efficiency of earth-to-air heat exchangers, Jun. 5, 2020, p. 1-6 (Year: 2020).*
Czachor, PVC Pipe: 21st Century Solution for Clean Water, Sewage, Dec. 2, 2011, p. 1-5 (Year: 2011).*
C-Therm, The Thermal Conductivity of Unfilled Plastics, Aug. 26, 2019, p. 2-3 (Year: 2019).*

* cited by examiner

*Primary Examiner* — Chester T Barry
(74) *Attorney, Agent, or Firm* — Riverside Law LLP

(57) ABSTRACT

A water treatment process (10) includes, in a crystallisation stage (12), passing a saline water feed (16) through an elongate conduit kept in a cold environment at a temperature below the equilibrium freezing temperature of the saline water, forming a slurry of brine and ice crystals inside the conduit, and, in a separation stage (14), separating the ice crystals from a bulk of the brine, producing a brine stream (22) and an ice stream (26). The elongate conduit is of a material, or has an inner material layer in contact with the saline water and with the slurry of brine and ice crystals, with a thermal conductivity of less than 5 W/m·K and has a length configured to ensure formation of the slurry of brine and ice crystals in the conduit at the flow rate of the saline water feed through the elongate conduit.

12 Claims, 11 Drawing Sheets

TREATMENT OF WATER

THIS INVENTION relates to the treatment of water. In particular, the invention relates to a water treatment process, and to water treatment apparatus.

It is well-known that water can be desalinated by freezing. The desalination of water by freezing relies on the principle that the structure of an individual ice crystal does not accommodate salts. Salts are thus rejected by growing ice crystals during the freezing of a salt solution. The ice crystals can be separated from a resultant concentrated solution or brine. When the ice crystals are melted, substantially pure water is yielded. Freeze desalination thus provides a way in which wastewater can be treated to produce pure water and has been considered, for example, for the desalination of mine waters. All freeze desalination methods for purification of water involve in one form or another ice crystallisation, separation of ice and brine, typically surface washing of the ice, and melting of the ice crystals to provide purified water.

One reason for freeze desalination to be potentially an attractive process for treatment of water is the far lower latent heat of fusion of ice (333 kJ/kg) compared to the latent heat of evaporation of water (2500 kJ/kg). The theoretical energy required to drive an evaporation process is thus seven times more than that for a freezing process. Although this does not take into account the possibility of energy recovery in either systems, the potential economic benefits of using freeze desalination remain high. Additional advantages of freeze desalination over other methods of desalination include minimisation of inevitable thermodynamic losses during heat exchange, that waste water containing toxic compounds, heavy metals and organic compounds which are difficult to treat by conventional methods can be treated, that the ice crystals produced are excellent latent heat storage material capable of storing cold energy of high density, that freeze desalination enables concentration of approximately 80% of dissolved compounds in approximately 25% of an original process water volume, and that due to low operating temperatures, low cost materials can be used in building freeze desalination plants, minimising capital costs and corrosion potential. A freeze crystallisation or desalination process can thus be used as both wastewater treatment system and cold heat storage in one facility, which makes load-shifting possible. Freeze desalination is also suitable for dealing with wastewaters rich in volatile organic compounds as, unlike distillation which results in the generation of toxic gasses or corrosive steam, the release of volatiles is limited at low temperatures.

In suspension freeze crystallisation, numerous small ice crystals are formed in a mother liquor, which are then filtered off to recover pure ice. In progressive freeze crystallisation, a large single ice crystal is formed on a cold surface and thawed off to recover pure water. Suspension freeze crystallisation tends to show higher productivity than progressive freeze crystallisation, but there are barriers to the successful implementation of suspension freeze crystallisation systems. These barriers include the process complexity emanating from the need to grow individual ice crystals in a growth tank, by Ostwald ripening, and washing in a wash column using a pressurized freshwater stream. When ice crystals are to be formed in a solution passed through a pipe heat exchanger, scraped surface heat exchangers are typically required to remove accumulated ice from an inner, cold surface of the heat exchanger tube. Scraped surface heat exchangers tend to be complex and expensive and there is thus a need for a freeze crystallisation process which avoids at least some of the complexities and costs of conventional freeze desalinisation processes and plants.

According to one aspect of the invention, there is provided a water treatment process that includes in a crystallisation stage, passing a saline water feed through an elongate conduit kept in a cold environment at a temperature below the equilibrium freezing temperature of the saline water, forming a slurry of brine and ice crystals inside the conduit; and in a separation stage, separating the ice crystals from a bulk of the brine, producing a brine stream and an ice stream, the elongate conduit being of a material, or having an inner material layer in contact with the saline water and with the slurry of brine and ice crystals, with a thermal conductivity of less than about 5 W/m·K and having a length configured to ensure formation of the slurry of brine and ice crystals in the conduit at the flow rate of the saline water feed through the elongate conduit.

The thermal conductivity of the material or material layer may be less than about 3 W/m·K or less than about 2 W/m·K or less than about 1 W/m·K or less than about 0.5 W/m·K, e.g. about 0.19 W/m·K.

An inlet velocity of the saline water feed in the elongate conduit may be between about 0.1 m/s and about 4.0 m/s, preferably between about 0.2 m/s and about 2.0 m/s, more preferably between about 0.4 m/s and about 1.5 m/s, e.g. about 1.2 m/s.

The elongate conduit may have a length of at least about 50 m, preferably at least about 70 m, more preferably at least about 75 m, e.g. about between about 80 m and about 400 m. For large flow rates multiple elongate conduits may be used in parallel to handle the required flow.

Typically, the length of the conduit does not exceed 400 m.

The elongate conduit may have an outer diameter of between about 10 mm and about 90 mm, preferably between about 12 mm and about 75 mm, more preferably between about 12 mm and about 50 mm, e.g. about 12 mm or about 20 mm or about 25 mm or about 32 mm.

The elongate conduit may have a wall thickness of between about 1.5 mm and about 6.7 mm, preferably between about 1.5 mm and about 5.6 mm, more preferably between about 1.5 mm and about 4.7 mm, e.g. about 1.5 mm or about 3 mm.

The elongate conduit may be flexible.

Preferably, the elongate conduit is of a synthetic plastics or polymeric material, e.g. polyvinyl chloride or chlorinated polyvinyl chloride.

The saline water feed is preferably pumped or fed through the elongate conduit at an inlet pressure which does not exceed about 5 bar (gauge), e.g. between about 0.1 bar (gauge) and about 5 bar (gauge), or between about 0.5 bar (gauge) and about 5 bar (gauge), e.g. about 0.5 bar (gauge). These relatively low feed pressures are as a result of the use of an elongate conduit with a low thermal conductivity, preferably of low cost, which would thus tend to be a non-reinforced conduit of a synthetic plastics or polymeric material, such as a PVC conduit typically used for irrigation purposes, and which is thus typically much less able to withstand high pressures than typical metal heat transfer tubes used in conventional heat exchangers. As will be appreciated, the relatively low inlet pressure limits the flow rate per conduit for a given conduit diameter. The length of the conduit will in turn be determined by the flow rate and a desired retention time for the saline water feed in the crystallisation stage, based on the heat transfer rate achieved in the crystallisation stage to achieve a desired level of ice formation in the slurry of ice and brine formed inside the elongate conduit.

Preferably, the conduit is not arranged linearly. Thus, in one embodiment of the invention, the conduit is coiled. The coiled conduit may extend in a vertical direction, with an inlet at a bottom of the coil and an outlet at the top of the coil.

The coil may include layers of conduit that are vertically stacked. The layers of conduit may be in the form of spirals in a plane winding. A spiral layer with an inlet at an outer end of the spiral may be adjacent, i.e. immediately below or immediately above, a spiral layer with an inlet at an inner end of the spiral, and vice versa.

Preferably, the layers of conduit, e.g. the spiral layers of conduit, are separated by supports, e.g. support grids.

The crystallisation stage may include a bath containing a heat transfer medium in contact with the elongate conduit. Preferably, the heat transfer medium is a liquid.

Typically, the elongate conduit inside the bath is submerged in the heat transfer medium. In one embodiment of the invention, the heat transfer medium is a mixture of refrigerant (e.g. an alcohol (e.g. methanol or ethanol) or ethylene glycol) and water, e.g. a 30% by mass methanol and water mixture.

The bath may include more than one elongate conduit submerged in the heat transfer medium. The elongate conduits may be arranged in separate coils that are horizontally spaced. Instead, two or more coils, each made up of a separate elongate conduit, may be stacked on top of each other.

The cold environment may have a temperature of between about −2° C. and about −25° C., preferably between about −5° C. and about −15° C., more preferably between about −10° C. and about −15° C., e.g. about −11° C. Thus, when a liquid heat transfer medium in a bath is used, the liquid heat transfer medium may have a temperature as described for the cold environment.

Typically, the process includes circulation the heat transfer medium through a chiller or the like to maintain the temperature of the heat transfer medium at a suitably low value. Instead, the heat transfer medium may be a first heat transfer medium, the process employing a second heat transfer medium which is chilled and used in heat exchange relationship with the first heat transfer medium to cool the first heat transfer medium.

The chiller can be replaced or supported with natural cold conditions in areas where temperatures are permanently below −5° C. for long periods, e.g. for several months of the year.

The elongate conduit, the rate of passing of saline water through the elongate conduit, a temperature of the saline water feed to the elongate conduit, and the temperature and nature of the cold environment may be configured or selected such that heat is transferred from the saline water inside the elongate conduit to the cold environment through the wall of the elongate conduit, at a rate given by the formula $q = UA\Delta T$, where q is heat transfer in W, U is the overall heat transfer coefficient in $W/(m^2 \cdot K)$, A is the outer surface area of the elongate conduit in $m^2$ and $\Delta T$ is the temperature difference between saline water fed into the elongate conduit and the cold environment, such that U is less than about 300 $W/(m^2 \cdot K)$ or less than about 200 $W/(m^2 \cdot K)$ or less than about 150 $W/(m^2 \cdot K)$, or less than about 100 $W/(m^2 \cdot K)$, e.g. between about 40 and about 80 $W/(m^2 \cdot K)$.

Typically, U is at least 20 $W/(m^2 \cdot K)$ or at least 30 $W/(m^2 \cdot K)$.

The rate of passing of saline water through the elongate conduit, the temperature of the saline water feed to the elongate conduit, the temperature of the cold environment and the length of the elongate conduit may be selected such that the slurry of brine and ice crystals formed inside the elongate conduit comprises between about 5% by mass and about 60% by mass ice, preferably between about 10% by mass and about 50% by mass ice, more preferably between about 10% by mass and about 30% by mass ice, e.g. about 15% or about 20% by mass ice.

The brine of the slurry of brine and ice crystals may be saturated with one or more salts, so that the slurry then also includes salt crystals (e.g. $MgSO_4 \cdot 7H_2O$ and/or $Na_2SO_4 \cdot 10H_2O$ and/or $Al_2(SO_4)_3 \cdot 16H_2O$), in addition to ice crystals. Whether the brine of the slurry of brine and ice crystals is saturated with one or more salts will depend on the composition, and in particular dissolved salt concentration, of the saline water feed, as will be appreciated.

Separating the ice crystals from a bulk of the brine may include feeding the slurry of brine and ice crystals into a separator of the separation stage in which ice crystals are allowed to rise as a result of the density difference between ice and brine, forming an ice and brine body in contact with concentrated brine;

withdrawing ice and brine from the ice and brine body in the separator; and withdrawing concentrated brine from the separator.

The separator may include a separation vessel into which the slurry of brine and ice crystals is fed. The separation vessel may have a conical bottom. Typically, concentrated brine is withdrawn from a bottom of the separation vessel. The concentrated brine withdrawn from the separation vessel may include precipitated salt, e.g. about 10 to 20% by mass of salt crystals.

The separator may include a hood to collect the ice and brine body. In one embodiment of the invention, the hood is conical or frustoconical.

The separator may include an outer vessel housing the separator vessel, with a heat transfer medium being located in the outer vessel and at least partially surrounding or submerging the separation vessel. In other words, the separation vessel may be held in a bath to inhibit heat loss from the slurry of brine and ice crystals fed into the separation vessel. The same heat transfer fluid used in the crystallisation stage may be used in the separator.

The process may include recycling brine and ice from the separator to the saline water feed to the elongate conduit. The brine and ice recycled to the feed of saline water to the elongate conduit may be withdrawn from the separator, at an elevation which is above the elevation at which concentrated brine is withdrawn from the separator. The recycled ice serves to provide seed ice crystals for ice crystal growth. Advantageously, the brine and ice recycled to the saline water feed to the elongate conduit may include salt crystals, acting as seed crystals for salt crystal growth inside the elongate conduit. Producing large ice and salt crystals through recirculation of ice crystals and salt crystals has the benefits that the purity of both salt and ice crystal improves, that the larger ice crystals separate easier from the larger salt crystals, and that ice and salt crystals dewater faster.

The process may include adjusting the elevation or level from which brine and ice are withdrawn from the separator, so as to manipulate the concentration of ice crystals and/or the concentration of salt crystals recycled to the feed of saline water to the elongate conduit. Ice and salt crystal concentration in the feed of saline water may instead be controlled by feeding a desired or preselected concentration of salt and/or ice crystals with a dedicated pump for each from a storage tank containing a slurry of crystals.

The brine and ice recycled to the saline water feed to the elongate conduit may include between about 5% by mass and about 40% by mass ice, preferably between about 10% by mass and about 35% by mass ice, more preferably between about 20% by mass and about 30% by mass ice, e.g. about 25% by mass ice.

The process may include withdrawing concentrated brine as an overflow from the separation vessel. The concentrated brine overflow may be used to control a concentrated brine level in the separator, so that the concentrated brine level in the separation vessel remains constant. Typically, the concentrated brine overflow is substantially free of ice crystals.

The hood of the separation vessel may be below the concentrated brine level in the separation vessel.

The concentrated brine overflow, or at least a portion thereof, may be recycled to the saline water feed to the elongate conduit.

The ice and brine withdrawn from the from the ice and brine body in the separator may include between about 10% by mass and about 70% by mass ice, preferably between about 20% by mass and about 60% by mass ice, more preferably between about 30% by mass and about 50% by mass ice, e.g. about 50% by mass ice. As will be appreciated, the ice and brine withdrawn from the from the ice and brine body in the separator thus typically include a higher concentration of ice than the slurry of brine and ice crystals produced by the elongate conduit.

The process may include, in the separation stage, separating the ice and the brine of a stream of ice and brine withdrawn from the ice and brine body in the separator. Separating the ice and the brine in said stream may be by way of filtration.

In one embodiment of the invention, said filtration is effected by discharging the ice and brine stream onto a belt filter. If desired or necessary, the belt filter may employ a vacuum to draw brine through the belt filter.

A retention time of the ice on the belt filter may be between about 5 minutes and about 300 minutes, preferably between about 10 minutes and about 90 minutes, e.g. about 60 minutes.

The belt filter may be insulated to inhibit heat loss to the environment. In one embodiment of the invention, the belt filter is thus housed within an insulated housing so that the temperature inside the housing is maintained in the range of about −5° C. to about 10° C. Advantageously, at the environmental temperature of the belt filter, some melting of ice crystals is allowed to take place, with said melting producing water which washes the ice crystals on the belt filter, thus increasing the purity of any water eventually obtained from the ice crystals.

Brine separated from the ice, or at least a portion thereof, may be recycled to the saline water feed to the elongate conduit.

The process may include separating salt crystals from the concentrated brine withdrawn from the separator. Separating salt crystals from the concentrated brine may be by way of filtration.

In one embodiment of the invention, said filtration to separate salt crystals from the concentrated brine is effected by discharging the concentrated brine onto a belt filter. If desired or necessary, the belt filter may employ a vacuum to draw brine through the belt filter.

Brine separated from the salt crystals, or at least a portion thereof, may be recycled to the saline water feed to the elongate conduit.

The crystallisation stage may be a first crystallisation stage and the separation stage may be a first separation stage, the process employing a second crystallisation stage in flow communication with the first separation stage to receive the brine stream from the first separation stage as a saline water stream, forming a slurry of brine and ice crystals inside a conduit of the second crystallisation stage, with the ice crystals being separated from a bulk of the brine in the second separation stage, producing a brine stream and a further ice stream.

By employing two crystallisation stages in series, it is possible to produce ice from the first separation stage, without producing salt crystals, simply by ensuring that the salt concentration does not exceed the solubility of the salt in the brine in the first crystallisation stage. Further concentration of the salt in the second crystalliser, as a result of removal of water as ice from the brine, can then lead to salt crystal formation if the salt concentration exceeds the solubility of the salt in the brine in the second crystallisation stage. In this way, for example, a copper leachate can be treated to produce ice from a first crystallisation stage, and to produce ice, brine and precipitated $Al_2(SO_4)_3.16H_2O$ from a second crystallisation stage.

The second crystallisation stage may have the same or similar features or characteristics as hereinbefore described for the first crystallisation stage.

The second separation stage may have the same or similar features or characteristics as hereinbefore described for the first separation stage.

The process of the invention is typically employed as a continuous process, although naturally it can also be used on a batch basis, if desired. When employed as a continuous process, the process typically includes withdrawing a discharge stream of concentrated brine to maintain a water and salt mass balance, thereby preventing the concentration of dissolved or crystallised salts in the saline water feed to the elongate conduit from rising beyond a predetermined level as a result of recycling of concentrated brine to the saline water feed to the elongate conduit.

The saline water feed may be brine from a final membrane separation stage of a reverse osmosis process to remove salt from saline water. Thus, the water treatment process of the invention may include a reverse osmosis process to remove salt from saline water.

Instead, the saline water feed may be brine from a final membrane separation stage of a process to remove salt from saline water that employs at least two membrane separation stages in series, with an intervening salt precipitation step at a lowered temperature. Such a process is described in WO 2017/191494 A1. Thus, the water treatment process of the invention may include a process to remove salt from saline water, said process to remove salt from saline water including at least two membrane separation stages in series, with an intervening salt precipitation step at a lowered temperature, to produces a brine, and feeding said brine to said crystallisation stage as a saline water feed to said elongate conduit kept in a cold environment.

Said process to remove salt from saline water that includes at least two membrane separation stages in series, with an intervening salt precipitation step at a lowered temperature, may be a process as described in WO 2017/191494 A1.

The water treatment process of the invention may include, prior to the crystallisation stage, removing metals from the saline water feed. The metals may be removed by dosing the saline water feed with an alkali, e.g. $Na_2CO_3$, NaOH, $Mg(OH)_2$, MgO, KOH or $NH_4OH$.

The saline water feed may be acidic (e.g. in the case of acid mine drainage or a copper leachate), and the dosing thereof with an alkali may gradually increase the pH of the saline water so that different metals can be removed at different pH. For example, $Fe^{3+}$ can be precipitated at pH 3 as $Fe(OH)_3$, which can be converted to pigment only through heat treatment, $Al^{3+}$ can be precipitated at pH 4.3 as $Al(OH)_3$, $CaCO_3$ can be precipitated at a pH of about 4 if $Ca^{2+}$ is present in the saline water feed and if $Na_2CO_3$ is used as the alkali or if $HCO_3^-$ is present in the saline water feed and $OH^-$ is added with the alkali. $Cu(OH)_2$ can be precipitated at a pH of about 7. $Al(OH)_3$ is saleable as is, but can also be reacted with $H_2SO_4$ to produce saleable $Al_2(SO_4)_3 \cdot 16H_2O(s)$, which is used as a coagulant in water treatment.

Recovery of pigment may be an important benefit of the process of the invention. Often leachate (e.g. acid mine water) is rich in $Fe^{2+}$. $Fe^{2+}$ needs to be oxidised to $Fe^{3+}$ before pigment can be formed. Either natural oxidation with bacteria and air can be used by allowing the $Fe^{2+}$ water to stand in a pond for a long time or it can be oxidised electrolytically.

Instead of removing metals from the saline water feed, prior to the crystallisation stage, metals can be removed from the discharge stream of concentrated brine. If metals removal is effected to the discharge stream of concentrated brine it offers the benefit that the metal concentration is increased and that smaller volumes of water or brine need to be treated for recovery of saleable products such as pigment, $Al(OH)_3$ and $CaCO_3$.

The process may include further concentrating the discharge stream of concentrated brine (typically after metals removal) to recover salts. For example, the discharge stream of concentrated brine can be concentrated further, e.g. by evaporation and cooling, or by way of freeze crystallisation as hereinbefore described, to recover $MgSO_4 \cdot 7H_2O$ and/or $Na_2SO_4 \cdot 10H_2O$. $MgSO_4$ has a solubility of 220 g $MgSO_4$/1000 g $H_2O$ at 0° C. and 443 g $MgSO_4$/1000 g $H_2O$ at 30° C. If MgO or $Mg(OH)_2$ is used for removal of $Cu^{2+}$ or $Fe^{2+}$ or $Fe^{3+}$. $MgSO_4 \cdot 7H_2O$ (Epsom salt) will be recovered with the discharge stream of concentrated brine. This product is used in the manufacturing of fertilizer and has a high value. For water rich in $Na^+$, it will be better to use alkalis such as $Na_2CO_3$ and or NaOH for metals removal so that $Na_2SO_4$ is the main compound in the discharge stream of concentrated brine.

In one embodiment of the invention, the saline water feed is highly polluted water, such as leachate from toxic waste disposal dumps. Such highly polluted water may have a typical TDS (total dissolved solids) concentration of 180 000 mg/L and a COD (chemical oxygen demand) of 10 000 mg/L (as $O_2$). With such water the TDS of the ice after one treatment for ice formation in the crystallisation stage, may still be 20 000 mg/L or higher. By melting the ice and treating the resultant water again in the same or in a second crystallisation stage, i.e. by subjecting the resultant water to a second crystallisation step, the TDS of melted water produced from ice from the second crystallisation step may advantageously be less than about 2000 mg/L.

The process may include reducing any chilling duty required by exchanging heat between the saline water feed and ice produced by the process. Typically, such heat exchange is in an indirect heat exchange relationship, e.g. using an elongate PVC conduit in contact with product ice. Advantageously, such heat exchange may reduce the saline water feed temperature from ambient temperature to near 0° C.

According to another aspect of the invention, there is provided water treatment apparatus to treat a saline water feed, the apparatus including a crystallisation stage with an elongate conduit located within a cold environment, the elongate conduit being configured to receive said saline water feed and to allow said saline water feed to pass through the conduit;

cooling means to keep the cold environment at a temperature below 0° C. to ensure formation of a slurry of ice and brine inside the elongate conduit as a result of heat exchange between the saline water feed inside the conduit and the cold environment; and a separation stage in flow communication with the crystallisation stage to receive said slurry of ice and brine from the elongate conduit and to separate ice crystals from brine, the elongate conduit being of a material, or having an inner material layer with a thermal conductivity of less than about 5 W/m·K and having a length of at least 50 m.

The elongate conduit may be as hereinbefore described.

The crystallisation stage may be as hereinbefore described.

The separation stage may be as hereinbefore described, and hence may include a separator as hereinbefore described.

The apparatus may include a chiller for a heat transfer medium, as hereinbefore described.

The separation stage may include filtration means to separate ice and brine. The filtration means may be a belt filter as hereinbefore described.

The apparatus may include filtration or separation means to separate salt crystals from a concentrated brine withdrawn from the separator. The filtration or separation means may be a belt filter as hereinbefore described in relation to the separation of brine and salt crystals.

The apparatus may include a second crystallisation stage and a second separation stage, as hereinbefore described.

The apparatus may include at least one membrane separation stage upstream of the crystallisation stage, or upstream of a first crystallisation stage, to produce said saline water feed to the elongate conduit.

The apparatus may include at least two membrane separation stages in series, with an intervening cooling and salt precipitation stage, e.g. as described in WO 2017/191494 A1, upstream of the crystallisation stage, or upstream of a first crystallisation stage, to produce said saline water feed to the elongate conduit.

The invention is now described with reference to the following studies and with reference to the accompanying drawings. In the drawings, FIG. 1 is a photograph of some PVC pipes with different diameters and/or wall thicknesses investigated in Study 1;

STUDY 1

Figure 1:

A study was conducted to evaluate conduit materials and construction for use in pipe freeze crystallisation. It is to be noted that a limitation of this study was that the water in the experiment was not flowing through the tubes or conduits as would be the case in a normal pipe freeze crystallisation plant.

PVC comes in two basic forms: rigid (sometimes abbreviated as RPVC) and flexible. The rigid form of PVC is used in construction for pipe and in profile applications such as doors and windows. It is also used in making bottles, non-food packaging, and cards (such as bank or membership cards). It can be made softer and more flexible by the addition of plasticisers, the most widely used being phthalates. In this form, it is also used in plumbing, electrical cable insulation, imitation leather, signage, phonograph records, inflatable products, and many applications where it replaces rubber.

The thermal conductivity of tubing materials describes the amount of energy required to increase the temperature of the liquid inside the tubing to the same temperature on the exterior of the tubing. Simply stated, thermal conductivity is the rate at which heat is transferred through a material. Different materials contain differing thermal conductivity rates, based upon their molecular structure. The heat flow through the tubing material increases or decreases as a result of the temperature difference driving force between the inside and the outside of the tube or conduit.

The thermal conductivity of some materials and the calculated heat transfer per unit of time is presented in Table 1. The ratings provided indicate the material's ability to transfer heat. The higher the rating of the material the greater the ability of the material to transfer heat. This transfer rate is influenced by the thickness of the materials. The unit W/m·K indicates the amount of energy in Watts or one joule per second taking into consideration the thickness of the material in meters and the temperature in kelvin. For this study, PVC was selected as the ideal material with a low thermal conductivity to prevent a layer of ice scale from forming on the cold surface (i.e. the inner conduit surface), which has been the experience with materials with a high heat thermal conductivity, such as steel.

TABLE 1

Piping, material and the thermal conductivity of the material.

| Piping | Material | W/m · K |
|---|---|---|
| Steel | Carbon Steel | 54 |
| CPVC | Chlorinated Polyvinyl Chloride | 0.14 |
| PVC | Polyvinyl Chloride | 0.19 |

Fourier's law examines the heat transfer through a solid material. This transfer is relative to outside area and thickness of the walls of the tubing. This is assuming that the heat transfer is at right angle to the path of the flow of heat and takes into consideration the differences in temperatures on the outside of the tubing and the inside of the tubing or conduit. As these temperatures are constantly changing throughout the day it is difficult to employ Fourier's law directly to this study beyond a hypothetical examination.

Fourier's Law is presented as:

$$q = kAdT/s$$

where: q=heat transferred per unit time (W)
A=heat transfer area ($m^2$)
k=thermal conductivity of the material (W/m·K or W/m ° C.)
dT=temperature difference across the material (K or ° C.)
s=material thickness (m)

Heat transfer through a surface like a wall can be calculated as:

$$q = UAdT$$

where
q=heat transfer (W (J/s))
U=overall heat transfer coefficient (W/($m^2$K))
A=wall area ($m^2$)
dT=$(t_1-t_2)$=temperature difference over wall (° C.)

In this study, the effect of pipe diameter and wall thickness on the rate of cooling was determined by placing the following pipes in a water bath at −10° C. (FIG. 1 shows some of the pipes):

20 mm diameter PVC pipe with 1.5 mm wall thickness
20 mm diameter PVC pipe with 3 mm wall thickness
25 mm diameter PVC pipe with 3 mm wall thickness
32 mm diameter PVC pipe with 3 mm wall thickness
40 mm diameter PVC pipe with 3 mm wall thickness
50 mm diameter PVC pipe with 3 mm wall thickness Six pipes with a length of 500 mm, diameter of between 20 and 50 mm and wall thickness of 1.5 mm for one pipe and 3 mm for the other five pipes were filled with tap water at room temperature to the same level. The initial temperature was measured in each pipe before the pipes were dipped into a bath filled with a secondary refrigerant at a temperature of −8° C. A stopwatch was started as soon as the pipes were dipped into the bath, with temperature being recorded every minute for each pipe using the thermometer.

The six pipes were left in the bath until the temperature dropped and stabilised. Once the temperature stabilised at 0° C. the stopwatch was stopped, the pipes were taken out of the bath and results were recorded. Observations were also made on the water inside the pipes.

Table 2 show the results collected during the experiment. Pipe 1, with the thinnest wall of 1.5 mm compared to the rest of the pipes with 3 mm wall reached 0° C. after just 7 minutes in the bath, which was faster than all the pipes, and the slowest was pipe 5 which has the largest diameter of 50 mm. Cooling rates of pipes 3 and 2 for the first 6 minutes of cooling are equal, although pipe 2 reached 0° C. first.

TABLE 2

Effect of pipe diameter and wall thickness on the cooling rate

|  | Pipe 1 | Pipe 2 | Pipe 3 | Pipe 4 | Pipe 5 | Pipe 6 |
| --- | --- | --- | --- | --- | --- | --- |
| Pipe dia. (mm) | 20 | 20 | 25 | 32 | 40 | 50 |
| Wall thickness (mm) | 1.3 | 3 | 3 | 3 | 3 | 3 |
| Time (min) | Temperature (° C.) | | | | | |
| 0 | 23 | 23 | 23 | 23 | 23 | 23 |
| 1 | 17 | 20 | 21 | 22 | 22 | 22 |
| 2 | 13 | 17 | 16 | 19 | 21 | 20 |
| 3 | 10 | 14 | 14 | 18 | 19 | 19 |
| 4 | 7 | 11 | 11 | 15 | 18 | 18 |
| 5 | 4 | 9 | 9 | 13 | 16 | 17 |
| 6 | 2 | 7 | 7 | 11 | 15 | 16 |
| 7 | 0 | 5 | 7 | 10 | 12 | 15 |
| 8 | 0 | 4 | 5 | 9 | 11 | 14 |
| 9 | 0 | 2 | 3 | 8 | 10 | 13 |
| 10 | 0 | 0 | 2 | 7 | 9 | 12 |
| 11 | 0 | 0 | 1 | 5 | 8 | 11 |
| 12 | 0 | 0 | 1 | 3 | 7 | 10 |
| 13 | 0 | 0 | 0 | 2 | 5 | 9 |
| 14 | 0 | 0 | 0 | 1 | 4 | 8 |
| 15 | 0 | 0 | 0 | 1 | 2 | 8 |
| 16 | 0 | 0 | 0 | 0 | 1 | 7 |
| 17 | 0 | 0 | 0 | 0 | 1 | 6 |
| 18 | 0 | 0 | 0 | 0 | 0 | 5 |
| 19 | 0 | 0 | 0 | 0 | 0 | 5 |
| 20 | 0 | 0 | 0 | 0 | 0 | 4 |
| 21 |  |  |  |  |  | 3 |
| 22 |  |  |  |  |  | 3 |
| 23 |  |  |  |  |  | 3 |
| 24 |  |  |  |  |  | 2 |
| 25 |  |  |  |  |  | 2 |
| 26 |  |  |  |  |  | 1 |
| 27 |  |  |  |  |  | 1 |
| 28 |  |  |  |  |  | 0 |

Note:
Pipe length = 500 mm

Figure 2:
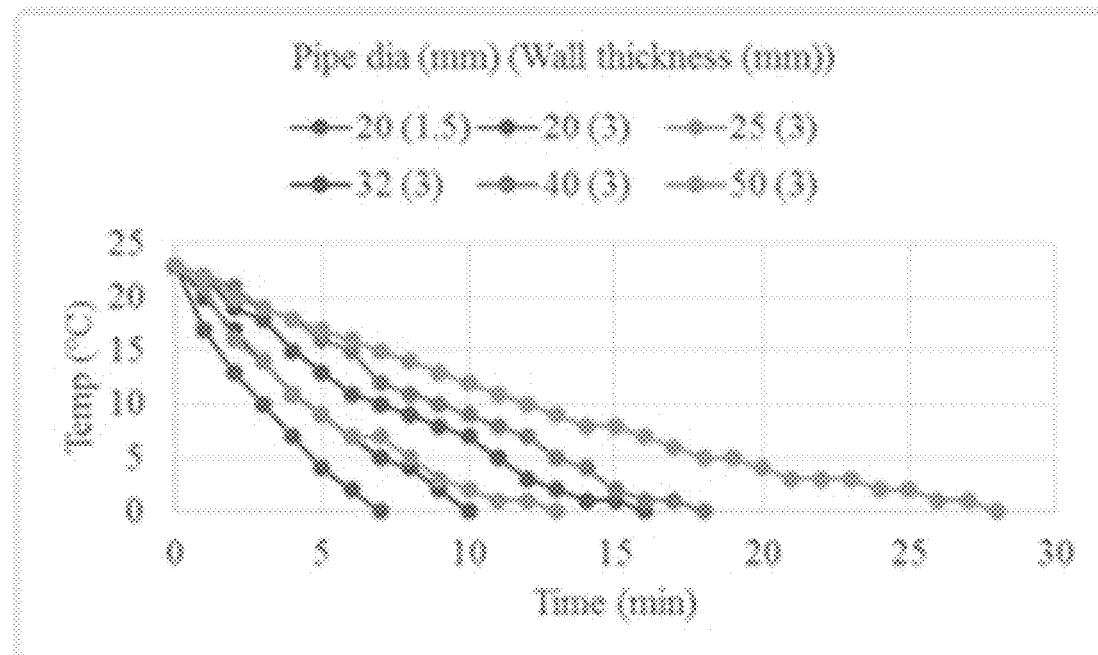
FIG. 2 shows graphs of temperature vs time for cooling of water in the PVC pipes with different diameters and/or wall thicknesses investigated in Study 1.

With pipe 3 having a higher calculated heat transfer rate q it would be ideal to use it ahead of pipe 2 which has a lower calculated heat transfer rate. Pipe 6 has the highest calculated heat transfer rate. This is due to the large surface area of the pipe. The cooling rate though, as shown in FIG. 2, is very slow, as it takes pipe 6 all of 28 minutes to reach 0° C. Pipes 2 to 6 have equal overall calculated heat transfer coefficients as a result of equal wall thickness of 3 mm.

The results show that pipe 1 with a thin wall of 1.5 mm and a 20 mm diameter would be the best pipe for pipe freeze crystallisation due to its highest cooling rate and high heat transfer compared to the other pipes. The worst pipe would be pipe 6 with the lowest cooling rate. Although it has a higher heat transfer compared to pipe 1, it is still not good as it will take much longer to reach the desired temperatures. Pipes 2 and 3 have almost similar cooling rates, though pipe 3 has a higher heat transfer rate. This indicates it would be better to go with pipe 3 ahead of pipe 2 as pipe 3 can allow a larger volume to flow through.

Although from a heat transfer perspective pipe 1 would be preferred, it was observed that due to the thin wall of pipe 1 it tends to collapse and to form too many bends at higher temperature which could result in blockages and even bursting as a result. A pipe with a strengthened wall like pipe 2 and pipe 3 in this case would be ideal for higher temperatures. Also for coils in a heat exchanger a pipe with a thick, strengthened wall is better.

Table 3 compares the combined cost (given in South African Rand) of pipe and support grids for various pipe diameters, for a heat exchanger to be used for pipe freeze crystallisation in accordance with the present invention. The following approach was followed.

i. Determine the time needed to cool water from 23° C. to 0° C. for the various pipes when submersed in a bath at −8° C. (see FIG. 2 and Table 2)
ii. Assume a cooling rate of 5.7 L/min (0.34 m³/h) is required.
iii. Calculate the length of pipe needed in case of the various pipe diameters to meet the required cooling rate using the following formula:

Pipe length (m)=Pipe length/Volume (m/L)×Required cooling rate (L/min)×Time needed for cooling (min)

iv. Calculate the cost of pipe (Length required×Price)
v. Calculate cost of support grids (as a cost of R1000/grid)

It was noticed that the combined cost of the pipe and grid decrease with increased pipe diameters for a wall thickness of 3 mm pipe. For a 20 mm diameter thick wall pipe the cost amounted to R16 025 compared to R13 042 for 32 mm dia. thick wall pipe. These figures did not make provision for a safety factor.

TABLE 3

Cost of cooling pipe and grid

| Parameter | Pipe | | | | | |
| --- | --- | --- | --- | --- | --- | --- |
| Dia (mm) | 20 | 20 | 25 | 32 | 38 | 50 |
| Wall thickness (mm) | 1.5 | 3 | 3 | 3 | 3 | 3 |
| Time for cooling (min) | 7 | 10 | 13 | 16 | 19 | 28 |
| Cross sectional area (cm²) | 3.14 | 3.14 | 4.91 | 8.04 | 11.34 | 19.63 |
| Pipe length/Volume (m/L) | 3.18 | 3.18 | 2.04 | 1.24 | 0.88 | 0.51 |
| Req Cooling rate (L/min) | 5.70 | 5.70 | 5.70 | 5.70 | 5.70 | 5.70 |
| Req pipe length (m) | 127.01 | 181.44 | 150.96 | 113.40 | 95.49 | 81.28 |
| Pipe price (R/m) | 8.23 | 15.26 | 22.52 | 38.27 | 47.82 | 51.89 |
| Pipe cost (R) | 1 045 | 2 768 | 3 400 | 4 340 | 4 566 | 4 218 |
| Length (m) | 13.90 | 14.50 | 15.50 | 16.90 | 15.00 | 16.50 |
| Disc dia (mm) | 808 | 856 | 936 | 1 048 | 1 064 | 1 204 |
| Pipe length/Grid (808 mm dia) (m) | 13.90 | 13.69 | 13.38 | 13.03 | 11.39 | 11.07 |
| No of grids | 9.14 | 13.26 | 11.28 | 8.70 | 8.38 | 7.34 |
| Grid cost (R/Grid) | 1 000 | 1 000 | 1 000 | 1 000 | 1 000 | 1 000 |
| Grid cost (R) | 9 137 | 13 256 | 11 282 | 8 703 | 8 383 | 7 341 |
| Pipe + Grid Cost (R for 10 L/min) | 10 182 | 16 025 | 14 682 | 13 042 | 12 950 | 11 559 |
| Velocity (m/s) | 1.21 | 1.21 | 1.21 | 1.21 | 1.21 | 1.21 |
| Recycle rate (L/min) | 22.81 | 22.81 | 35.64 | 58.39 | 82.34 | 142.55 |

TABLE 3-continued

Cost of cooling pipe and grid

| Parameter | Pipe | | | | | |
|---|---|---|---|---|---|---|
| Recycle rate (m³/h) | 1.37 | 1.37 | 2.14 | 3.50 | 4.94 | 8.55 |
| Heat transfer, q (W) | 91.53 | 45.76 | 57.20 | 73.22 | 86.95 | 114.41 |
| Heat transfer coefficient, U (W/m².K) | 126.67 | 63.33 | 63.33 | 63.33 | 63.33 | 63.33 |

Heat transfer, q = k A dT/s = 0.19 × 2 × Π × 0.01 × 0.5 × 23/0.0015 = 91.53 W
k = 0.19 W/(m.K) for PVC
A = 2 × Π × 0.01 × 0.5
dT = 23° C.
s (wall thickness) = 15 mm
Heat transfer coefficient, U = q/A.dT in W/(m² · K)

Table 4 calculates the required recycle rate needed for each pipe to maintain a velocity of 1.2 m/s in each pipe. The pressure drop for PVC pipes with a length of 360 m is also shown.

TABLE 4

Recycle flow rate and pressure drop in cooling pipe

| Dia (mm) | 20 | 20 | 25 | 32 | 38 | 50 |
|---|---|---|---|---|---|---|
| Wall thickness (mm) | 1.5 | 3 | 3 | 3 | 3 | 3 |
| Pipe length (m) | 360 | 360 | 360 | 360 | 360 | 360 |
| Feed (m³/h) | 0.34 | 0.34 | 0.34 | 0.34 | 0.34 | 0.34 |
| Recycle rate (m³/h) | 1.37 | 1.37 | 2.14 | 3.50 | 4.94 | 8.55 |
| Recycle rate (L/min) | 22.81 | 22.81 | 35.64 | 58.39 | 82.34 | 142.55 |
| Velocity (m/s) | 1.21 | 1.21 | 1.21 | 1.21 | 1.21 | 1.21 |
| Recycle to feed ratio | 4.02 | 4.02 | 6.29 | 10.30 | 14.53 | 25.16 |
| Pressure (bar) | 3.34 | 3.34 | 2.53 | 1.86 | 1.51 | 1.07 |

The information from this study can advantageously be used to design a crystallisation stage of water treatment apparatus in accordance with the invention to treat a saline water feed.

STUDY 2

A reverse osmosis/cooling process (the ROC process) was developed for the treatment of brines from desalination processes, such as reverse osmosis processes. The ROC process is described in WO 2017/191494. The focus is on water and chemical recovery (e.g. calcium carbonate, sodium sulphate, magnesium hydroxide and magnesium sulphate) to minimise sludge and brine disposal. In the ROC process, brine is treated with chemicals such as $Na_2CO_3$ and/or NaOH in a pre-treatment stage to allow selective precipitation of metals (e.g. $CaCO_3$, $MnO_2$ and $Mg(OH)_2$). After pre-treatment, the sodium and magnesium rich water is passed through a membrane stage to produce drinking water and brine. The brine has a $Na_2SO_4$-concentration high enough to allow $Na_2SO_4$ crystallisation upon cooling/freeze desalination if $Na_2CO_3$ is used during pre-treatment.

Figure 4:
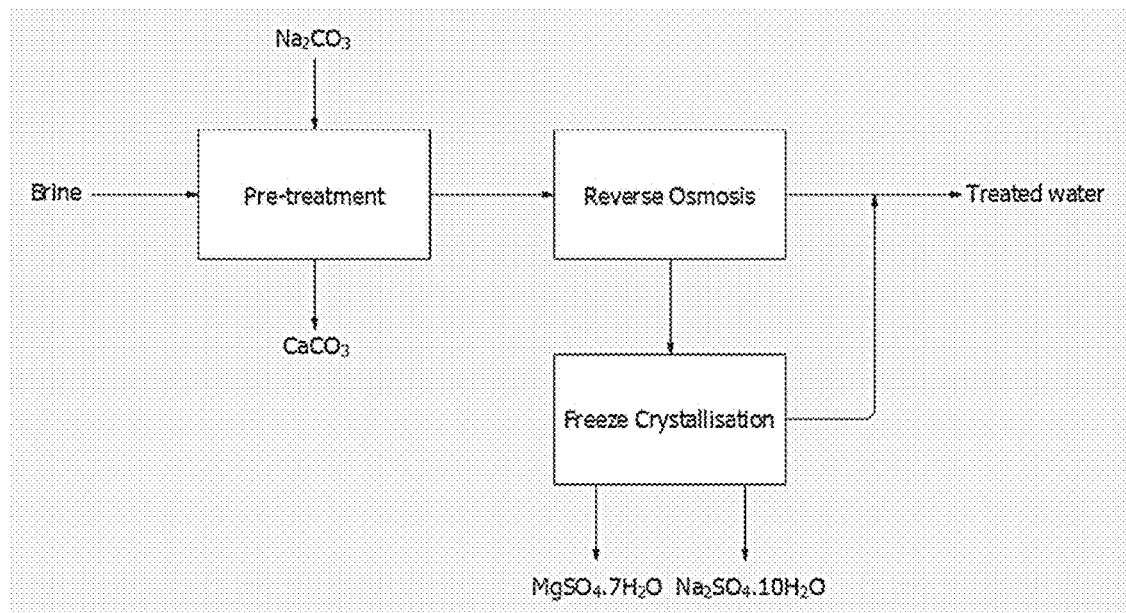
FIG. 4 shows a flow sheet of a process employing reverse osmosis combined with freeze desalination for the recovery of clean water and saleable products such as $CaCO_3$ and $Na_2SO_4 \cdot 10H_2O$ from reverse osmosis brine, investigated in Study 2.

The purpose of this study or investigation was to compare freeze crystallisation (FC) applied to reverse osmosis brine, with the ROC process combined with freeze desalination, for the recovery of clean water and saleable products such as $CaCO_3$ and $Na_2SO_4.10H_2O$. FIG. 4 shows a flow sheet of the investigated ROC process combined with freeze desalination.

Methodology
Feedstock

Brine, treated with lime for neutralization and reverse osmosis for desalination, was collected from a mine in the Mpumalanga province, South Africa. Brine obtained from the reverse osmosis was treated directly with freeze crystallisation.

Equipment and Procedure

A Tecumseh (971 W input power) reciprocating compressor (Model: AJE2444ZHZ (CAJ2464Z)) with a refrigeration capacity of 727 W, was used to cool a primary refrigerant, R-404A. The primary refrigerant was recycled through a heat exchanger in a water bath to cool a secondary refrigerant (30% methanol/water mixture) to −10° C. or as required. The heat exchanger and two plate baffles divided the bath in two sections, A and B. A centrifugal recycle pump passed secondary refrigerant through the heat exchanger from Section A to Section B. The temperature of the secondary refrigerant was controlled by a temperature controller. The temperature controller would cut the compressor in when a set temperature, typically −8° C., was reached, and cut the compressor out when a second set temperature, typically −10° C., was reached. A forced air condenser was used to condense the primary refrigerant.

The brine obtained from the reverse osmosis desalination process was cooled by passing it though a second heat exchanger, i.e. a PVC pipe in accordance with the present invention, submerged in the water bath containing the secondary refrigerant. The PVC pipe heat exchanger was submersed at such a depth as to maintain the temperature of the brine in the PVC pipe at −1° C. Brine and ice slurry from the PVC pipe heat exchanger was recycled to (i) equalise the temperature throughout the PVC pipe heat exchanger, and (ii) recycle ice crystals to stimulate the growth of ice crystals in the PVC pipe heat exchanger.

Brine exiting the PVC pipe heat exchanger was separated from ice crystals by passing it through a static brine/ice separator whose principle is based on density difference between water and ice. The separator consisted of an ice column (110 mm diameter; 1.2 m length) and a drainpipe (50 mm diameter) inside the ice column. Ice/brine slurry was pumped upwards through the ice column under low pressure using a peristaltic pump. The drainpipe was perforated, to allow brine to flow by gravity to a sump directly underneath the drainpipe. The lower section of the drainpipe had 12 mm holes covered with a 1 mm mesh wire gauze. Due to continuous deposition of ice crystals at the base of the column, the ice column moved to the top where a portion was harvested as product. The feed line to the ice column was provided with a pressure gauge to monitor pressure. Pressure build-up was an indication of excessive ice accumulation in the separator instead of normal upward ice movement in the ice column.

Brine was pumped through the PVC heat exchanger submerged in the secondary refrigerant to remove sufficient heat for (i) cooling of the feed brine from 15° C. to initially −7° C., the temperature where spontaneous nucleation takes place, followed by ice crystallisation, and (ii) latent heat removal needed for ice formation at −1.5° C. With ice recirculation the temperature stabilised immediately at −1.5° C. For the production of clean ice, it was necessary to avoid spontaneous nucleation of ice crystals. With spontaneous nucleation salt is trapped in the ice crystals resulting in salt contaminated ice. A Watson-Marlow peristaltic pump was used to circulate feed brine at 2.5 to 3.5 L/min from a sump through the submerged heat exchanger to the bottom of the ice/brine separation column.

Analytical

Samples were collected at various stages in the treatment process and filtered (Whatman No 1) and analysed for pH, Fe(II), acidity, conductivity, $Ca^{2+}$, $Mg^{2+}$, $Na^+$, $K^+$, $SO_4^{2-}$, $Cl^-$ and alkalinity using standard procedures as described in American Public Health Association, APHA 2012, Standard methods for the examination of water and wastewater, $22^{nd}$, Washington: American Water Works Association, Water Environment Federation. A calibrated Knick Stratos Eco 2505 meter was used to measure electrical conductivity. Ice content was determined by mixing 250 mL ice slurry (mass $m_1$; temperature $T_1$) with 200 mL ($m_2$) warm water ($T_2$). The mass of ice ($m_i$) was determined from $m_1$, $T_1$, $m_2$, $T_2$ and the temperature ($T_3$) was measured after the ice had melted. Microsoft Excel Goal Seek was used to calculate $m_i$ using the following equation:

$$4.18(m_1-m_i)(T_1-T_3)+330m_i+4.18m_2(T_2-T_3)=0 \quad (1)$$

Results and Discussion

Freeze Crystallisation

Freezing Point and Water Quality

Figure 3:
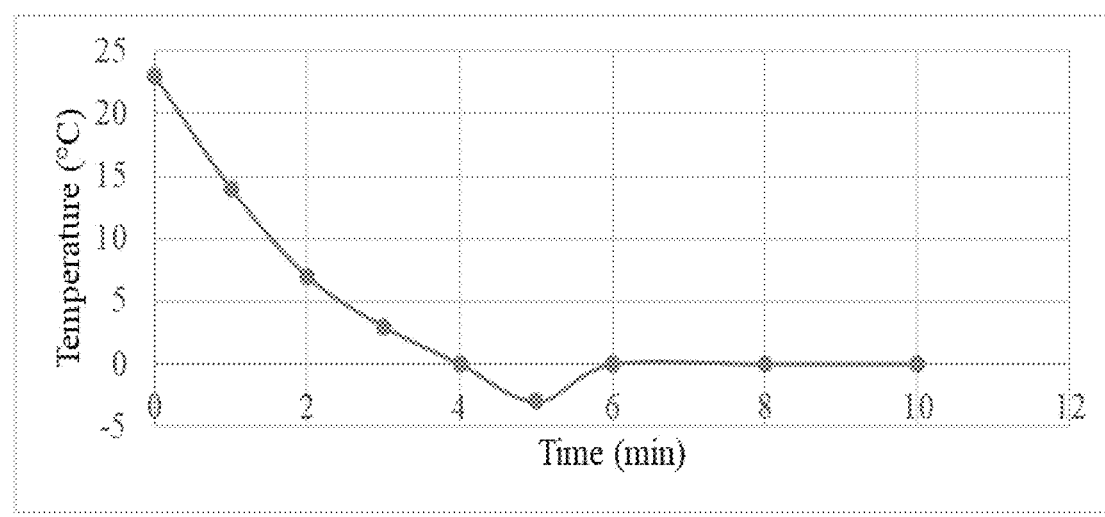
FIG. 3 shows a graph of temperature vs time for brine from a reverse osmosis plant that is cooled, indicating freezing at −3° C.

The freezing point of a liquid is affected by its salt content. FIG. 3 shows that brine from the RO plant that treats mine water freezes at −3° C. After ice crystallisation has commenced ice crystallisation continues at 0° C. Table 5 shows the quality of the feed water, i.e. brine from reverse osmosis, and that of the melted ice and brine. The Total Dissolved Solids (TDS) in the feed water (i.e. brine produced by reverse osmosis) was reduced from 25 989 mg/L to 265 mg/L in the melted ice. The brine (i.e. final brine obtained after freeze crystallisation) had a TDS of 51 712 mg/L. As the focus was on ice purity, the brine was not concentrated further. Clear ice was produced from the feed water brine and $Na_2SO_4.10H_2O$ precipitated from the feed water brine during freeze crystallisation. The conductivity was lowered from 25.3 mS/cm to <1.5 mS/cm. It is expected that the conductivity of the melted ice will be <1.0 mS/cm if the ice crystals are allowed time to mature. This will allow direct discharge of the melted ice with the product water from the reverse osmosis stage used to produce the feed water (30 m³/h feed) to the freeze crystallisation stage.

TABLE 5

Chemical compositions of the feed water (RO brine), ice and brine

| | Composition (mg/L) | | |
|---|---|---|---|
| Parameter (mg/L) | Feed | Ice | Brine |
| Ice recovery (%) | | 50.0 | |
| pH | 7.2 | 7.3 | 7.1 |
| Conductivity (mS/cm) | 25.3 | 1.5 | 50.2 |
| $SO_4^{2-}$ | 16 250 | 162 | 32 338 |
| $Cl^-$ | 1 242 | 14 | 2 470 |
| $HCO_3^-$ | 70 | 1 | 139 |
| $NO_3^-$ (as N) | 13 | 1 | 25 |
| $NH_4^+$ (as N) | 22 | 2 | 43 |
| $Na^+$ | 5 868 | 60 | 11 677 |
| $K^+$ | 951 | 9 | 1 893 |
| $Mg^{2+}$ | 524 | 5 | 1 043 |
| $Ca^{2+}$ | 1 027 | 11 | 2 043 |
| TDS (Calc.) | 25 989 | 265 | 51 712 |
| Cations (meq/L) | 376 | 3.9 | 747 |
| Anions (meq/L) | 376 | 3.9 | 747 |

Ice Formation and Energy Utilization

The energy utilization efficiency is determined by comparing the energy input of the refrigeration unit (0.727 kW) with the volume of water that is cooled and the ice that is formed. In the freeze crystallisation system, the secondary refrigerant (70% water and 30% methanol) is cooled with the refrigeration unit. The brine (feed water to the PVC pipe heat exchanger) in the PVC pipe heat exchanger is simultaneously cooled by the secondary refrigerant in the water bath.

Cooling of Secondary Refrigerant

Table 6 shows the temperatures of the secondary refrigerant when the compressor was on and when no PVC pipe was in the water. It showed the net energy transferred from the refrigeration unit to the water in the bath (168 L). The power absorbed dropped from 2.13 kW at 2.8° C. to 0.22 kW at −9° C. The COP (coefficient of performance) dropped from 2.93 to 0.31. These values exclude energy losses to the environment.

TABLE 6

Cooling of secondary refrigerant due to compressor

| Time (h) | Bath temp (° C.) | kW (Nett) | COP | kW (in) |
|---|---|---|---|---|
| | 7.00 | | | |
| 0.37 | 2.80 | 2.13 | 2.931 | 0.73 |
| 0.53 | 1.40 | 1.56 | 2.149 | 0.73 |
| 0.70 | — | 1.56 | 2.149 | 0.73 |
| 0.87 | −0.80 | 0.89 | 1.228 | 0.73 |
| 1.03 | −2.00 | 1.34 | 1.842 | 0.73 |
| 1.20 | −3.50 | 1.67 | 2.303 | 0.73 |
| 1.37 | −4.60 | 1.23 | 1.689 | 0.73 |
| 1.53 | −5.80 | 1.34 | 1.842 | 0.73 |
| 1.70 | −6.40 | 0.67 | 0.921 | 0.73 |
| 1.87 | −7.00 | 0.67 | 0.921 | 0.73 |
| 2.03 | −7.80 | 0.89 | 1.228 | 0.73 |
| 2.20 | −8.20 | 0.45 | 0.614 | 0.73 |
| 2.37 | −8.90 | 0.78 | 1.075 | 0.73 |
| 2.45 | −9.00 | 0.22 | 0.307 | 0.73 |

Compressor = on;
Bath volume = 168 L;
Pipe volume = 0 L

Table 7 shows the rate at which the temperature of the secondary refrigerant increased as a result of heat losses to the environment. This was measured by monitoring the temperature of the water in the bath over time while the compressor was off. The energy losses remained constant at 0.32 kW over the temperature range −9° C. to 2.3° C. This result showed that heat losses need to be minimized when temperatures of −9° C. or less are needed, as it could become equal to the net cooling capacity of the system. However, this limitation was not applicable in this case as the freezing point of RO brine was −3° C. and ice crystallised at −1° C. The above investigation only focused on heat losses from the bath on its own. It did not seek to determine heat losses outside the bath, namely (i) heat generated by the recycle pump and (ii) heat losses to the environment from the ice/brine separation system that is outside the water bath and in contact with the warmer atmosphere.

TABLE 7

Heating of secondary refrigerant due to heat losses

| Time h | Temp (° C.) Bath | kW Losses | Time h | Temp (° C.) Bath | kW Losses |
|---|---|---|---|---|---|
| 0.00 | −9 | | 2.17 | −5.4 | −0.37 |
| 0.33 | −8.9 | −0.06 | 2.67 | −4.4 | −0.37 |
| 0.50 | −8.7 | −0.22 | 3.17 | −3.4 | −0.37 |
| 0.67 | −8.4 | −0.33 | 3.67 | −2.4 | −0.37 |
| 0.83 | −8.2 | −0.22 | 4.17 | −1.5 | −0.33 |
| 1.00 | −7.8 | −0.45 | 4.67 | −0.9 | −0.22 |
| 1.17 | −7.4 | −0.45 | 5.17 | 0 | −0.33 |
| 1.33 | −7.1 | −0.33 | 5.67 | 0.7 | −0.26 |
| 1.50 | −6.6 | −0.56 | 6.17 | 1.5 | −0.30 |
| 1.67 | −6.4 | −0.22 | 6.67 | 2.3 | −0.30 |
| | | | | Average | −0.32 |

Compressor = off;
Bath volume = 168 L;
Pipe volume = 0 L

Ice Formation

The energy required for ice production was determined by measuring the mass of ice produced in an hour. Table 8 shows that the rate of ice production amounted to 4.37 kg/h. The energy utilised amounted to 0.36 kW, which was 50% (COP=0.5) of the power input. The difference can be explained by the small size of the plant, and heat losses to the atmosphere due to exposure to the atmosphere and the use of a recirculation pump that introduced heat to the system.

TABLE 8

Energy utilization during treatment of RO brine

| Time | Temp (° C.) | | Ice | Power (kW) | | |
|---|---|---|---|---|---|---|
| h | Bath | Brine | kg | In | Utilised | COP |
| 2.42 | −7.4 | −1 | 1.72 | 0.73 | | 0.00 |
| 2.92 | −7.8 | −1 | 1.90 | 0.73 | 0.35 | 0.48 |
| 3.42 | −6.4 | −1 | 2.10 | 0.73 | 0.39 | 0.54 |
| 3.92 | −6.8 | −1 | 2.70 | 0.73 | 0.50 | 0.69 |
| 4.42 | −6.0 | −1 | 1.97 | 0.73 | 0.37 | 0.50 |

TABLE 8-continued

Energy utilization during treatment of RO brine

| Time | Temp (° C.) | | Ice | Power (kW) | | |
|---|---|---|---|---|---|---|
| h | Bath | Brine | kg | In | Utilised | COP |
| 4.92 | −6.6 | −1 | 1.20 | 0.73 | 0.22 | 0.31 |
| 5.42 | −6.0 | −1 | 1.93 | 0.73 | 0.36 | 0.49 |
| 5.92 | −6.9 | −1 | 1.78 | 0.73 | 0.33 | 0.45 |
| | Average | | | 0.73 | 0.36 | 0.50 |

Capital and Running Cost for Freeze Desalination

The capital cost for a 30 m³/h freeze desalination plant was estimated at R27.2 million (Table 9) and the Running cost (Energy and Capital redemption cost) at R79.54/m³. At the time of filing of this patent application, 1 US $ amounted to about R14.

TABLE 9

Capital and running cost

| Parameter | Value |
|---|---|
| Flow (m³/h) | 30.00 |
| Energy needed (kW) | 2 644.67 |
| Electricity price (R/kWh) | 0.70 |
| Energy consumption (kWh/m³) | 88.16 |
| Energy cost (R/m³ brine) | 61.71 |
| Capital cost (R) | 27 205 376 |
| Capital redemption cost (R/m³) | 17.83 |
| Total cost (R/m³) | 79.54 |

Note:
Interest = 1% per month;
Term = 120 months

ROC Process

Due to the high cost of freeze crystallisation for treatment of reverse osmosis brine when used on its own, it was decided to compare the cost of a process using reverse osmosis and freeze crystallisation with a process in which brine was produced by the ROC process (reverse osmosis/cooling process), with the resultant brine then being subjected to freeze crystallisation. In the ROC process only 25% of the feed eventually needs to be treated by freeze crystallisation.

Water Quality and Product Recovery

Table 10 shows the quality of the water throughout the various stages of the ROC process taking place on a plant. The TDS will be reduced from 25 989 mg/L to 275 mg/L in the permeate of the RO stage. All elements responsible for membrane fouling will have been removed in the pre-treatment stage. This will allow brine with a TDS of 99 179 mg/L to be produced. During the freeze desalination stage, the brine volume of 8.25 m³/h after RO will be decreased to 1.65 m³/h after freeze desalination. The remaining 1.65 m³/h brine that contains mainly $Na^+$, $Mg^{2+}$ and $SO_4^{2-}$, can be stored in a pond for treatment at a later stage for recovery of $Mg(OH)_2$ and $Na_2SO_4.10H_2O$.

TABLE 10

Chemical composition of brine at various treatment stages

| | | | RO | | | Freeze desalination | | Freeze desalination | |
|---|---|---|---|---|---|---|---|---|---|
| Parameter | Feed | Chemical treatment | Permeate | Brine (RO) | Cooling Cooling | Melted ice | Brine (aq) | Melted ice | Brine (aq) |
| Flow (m³/h) | 30 mg/L | 30 mg/L | 21.75 mg/L | 8.25 mg/L | 8.25 mg/L | 6.6 mg/L | 1.65 mg/L | 6.6 mg/L | 1.65 mg/L |
| Temperature (° C.) | 21 | 25 | 25 | 25 | 0 | −2 | −2 | | |
| pH | 7.16 | 7.55 | 6.40 | 6.40 | 6.40 | 6.40 | | | |
| Conductivity (mS/m) | 2532.0 | | | | | | | | |
| $SO_4^{2-}$ (as $SO_4$) | 16250 | 16912 | 169 | 61053 | 31128 | 311 | 56805 | 311 | 154395 |
| $Cl^-$ | 1242.0 | 1242.0 | 12.4 | 4483.6 | 4483.6 | 44.8 | 22418.0 | 44.8 | 22238.8 |
| $HCO_3^-$ | 70.0 | 331.6 | 3.3 | 1197.1 | 1197.1 | 12.0 | 6344.0 | 12.0 | 5937.5 |
| $NO_3^-$ (as N) | 13.0 | 13.1 | 0.1 | 47.3 | 47.3 | 0.5 | 236.5 | 0.5 | 234.6 |
| $NH_4^+$ (as N) | 22.4 | 22.4 | 0.2 | 80.7 | 80.7 | 0.8 | 400.5 | 0.8 | 400.4 |
| $Na^+$ | 5868 | 7472 | 75 | 26973 | 12634 | 126 | 15493 | 126 | 62666 |
| $K^+$ | 951.0 | 951.0 | 9.5 | 3433.1 | 3433.1 | 34.3 | 17165.5 | 34.3 | 17028.2 |
| $Mg^{2+}$ | 524.0 | 524.0 | 5.2 | 1891.6 | 1891.6 | 18.9 | 9458.0 | 18.9 | 9382.5 |
| $Ca^{2+}$ | 1027.00 | 2.90 | 0.03 | 10.47 | 10.47 | 0.10 | 40.00 | 0.10 | 51.93 |
| TDS (Calc) | 25989 | | 275 | 99179 | 54915 | 549 | 128372 | 549 | 272380 |
| $Na_2SO_4(s)$ | | | | | 43762.3 | | | | |
| Cations (meq/L) | 375.6 | 394.1 | 3.9 | 1422.6 | 799.2 | 8.0 | 1921.7 | 8.0 | 3963.8 |
| Anions (meq/L) | 375.6 | 393.8 | 3.9 | 1421.5 | 798.0 | 8.0 | 1936.1 | 8.0 | 3958.3 |
| $CaCO_3$ (Calcite) | | 2557.7 | | | | | | 31.2 | |
| $Na_2SO_4 \cdot 10H_2O$ (Mirabilite) | | | | | 100374 | | 334105 | | |

Capital and Running Costs for the ROC Process Combined with Freeze Crystallisation Table 11 shows the feasibility of the ROC process combined with freeze crystallisation. It shows that the value of products exceeds the costs of chemicals and electricity. The capital cost of a 30 m³/h plant is estimated at R32,728,507, the chemical redemption cost (1% interest per month; 120 months) at R19.76/m³ feed, the chemical cost for removal of $Ca^{2+}$ and other elements at R17.03/m³ feed water and the electricity cost R8.00/m³. The total running cost amounts to R44.79/m³ feed. This cost compares favourably with the R79.54/m³ when only freeze crystallisation is used on a reverse osmosis brine. A benefit of the ROC process is that it offers the recovery of saleable products with a value R24.03/m³ of feed water.

TABLE 11

Economic feasibility of a 30 m³/h brine treatment plant

| Item | Cost | |
|---|---|---|
| Flow (m³/h) | 30 | |
| Capital cost (R) | 32 728 507 | |
| Expenses | R/month | R/m³ |
| Capital redemption cost (12%/a; 120 months) | −432 510 | −19.76 |
| Chemical cost | −372 800 | −17.03 |
| Electrical cost | −175 049 | −8.00 |
| Capital, Chemical and Electricity cost | −980 358 | −44.79 |

TABLE 11-continued

Economic feasibility of a 30 m³/h brine treatment plant

| Products | | |
|---|---|---|
| Water | 175 104 | 8.00 |
| $Na_2SO_4 \cdot 10H_2O$ | 498 157 | 22.76 |
| $CaCO_3$ | 27 712 | 1.27 |
| Total value of products | 700 972 | 32.03 |
| Gross income | −279 386 | −12.76 |

The following conclusions were made from this study:
1. RO brine has a freezing point of −3° and ice crystallizes at −1°.
2. Pure ice with a TDS of less than 300 mg/L can be recovered from RO brine with a TDS of 26 000 mg/L, using a PVC pipe heat exchanger, without requiring scraping of interior surfaces of the PVC pipe.
3. The COP (coefficient of performance) of 0.5 was measured for a laboratory-scale freeze crystallisation unit.
4. The combined capital redemption- and running-costs for brine treatment by reverse osmosis and freeze crystallisation were estimated to be R80.00/m³.
5. The capital redemption- and running-cost for brine treatment with the ROC (reverse osmosis/cooling) process in combination with freeze desalination were estimated to be R45.00/m³.
6. Saleable products with a potential value of R32.00/m³ can be recovered by means of the ROC process.
7. The technology outlined is an improvement on existing desalination technology for the following reasons: (i) It reduces brine volumes by crystallisation of dissolved species enabling further water recovery, and (ii) reduces the amounts of sludge produced by selectively allowing saleable products to be recovered.

STUDY 3

The Waste Act, 2008 and National Water Act, 1998 of South Africa were enacted to promote cleaner production, waste minimization, water reuse, recycling and waste treatment, with disposal seen as a last resort. The legislation stipulates that acids should be neutralized to have a pH between 6 and 12 before discharge onto a landfill site. The TDS content of brine or waste with a high salt content should not exceed 50 000 mg/L and the TDS from leachables should not exceed 100 000 mg/L, Copper leachate is an example of such a waste stream and has a pH of 3.2 and contains 8 520 mg/L $Mg^{2+}$, 510 mg/L $Ca^{2+}$, 86.6 mg/L $Cu^{2+}$, 509.5 mg/L $Fe^{2+}$, 509.2 mg/L $Fe^{3+}$, 13 538 mg/L $Al^{3+}$ and 109 408 mg/L $SO_4^{2-}$. Current methods of water treatment remove the adverse impacts, providing clean water for discharge, but leaves behind a concentrated waste that requires further treatment or disposal as a hazardous waste. Freeze desalination can be used for treatment of such highly saline solutions to: (i) produce water of a good enough quality and (ii) enable product recovery from a concentrated brine stream.

As stated hereinbefore, the ROC (Reverse Osmosis/Cooling) process was developed for the treatment of brines from desalination processes, such as reverse osmosis. In the ROC process, brine is treated with chemicals such as $Na_2CO_3$ and/or NaOH in a pre-treatment stage to allow selective precipitation of metals ($CaCO_3$, $MnO_2$ and $Mg(OH)_2$). After pre-treatment, the sodium- and magnesium-rich water is passed through a membrane stage to produce drinking water and brine. The brine has a $Na_2SO_4$-concentration which is high enough to allow $Na_2SO_4$ crystallization upon cooling/freeze desalination if $Na_2CO_3$ is used during pre-treatment.

Figure 5:
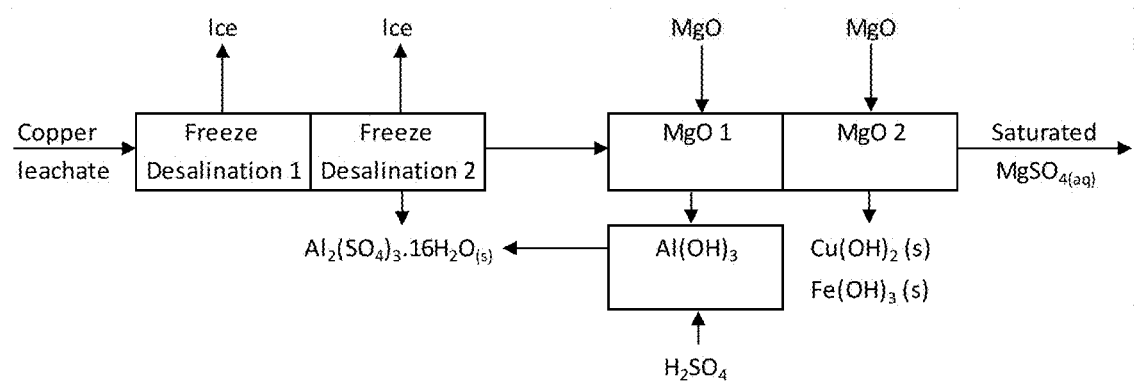
FIG. 5 shows a flow sheet of a process employing freeze crystallisation for the recovery of clean water and saleable products such as $Al_2(SO_4)_3$, $Al(OH)_3$ and $MgSO_4$ from copper leachate, investigated in Study 3.

The purpose of this investigation was to validate a process configuration as shown in FIG. 5 for the recovery of clean water and saleable products such as $Al_2(SO_4)_3$, $Al(OH)_3$ and $MgSO_4$ from copper leachate.

Methods

Feedstock

Copper leachate containing 8 520 mg $Mg^{2+}$, 510 mg $Ca^{2+}$, 86.6 mg $Cu^{2+}$, 509.5 mg $Fe^{2+}$, 509.2 mg $Fe^{3+}$, 13 538 mg $Al^{3+}$ and 109 408 mg $SO_4^{2-}$ per L of water, was prepared artificially.

Equipment and Procedure

A Tecumseh 971 W (input power) reciprocating compressor (Model: AJE2444ZHZ [CAJ2464Z]) with a refrigeration capacity of 727 W, was used to cool the primary refrigerant, R-404A. The primary refrigerant was recycled through a heat exchanger in a water bath to cool a secondary refrigerant (30% methanol/water mixture) to −10° C. or as required. Leachate was cooled to freezing point by passing it though a second heat exchanger, i.e. a PVC pipe in accordance with the present invention, submerged in the water bath containing the secondary refrigerant. An ice/brine mixture produced in the PVC pipe was passed through a static brine/ice separator. The separation was based on the density difference between water and ice. The separator consisted of an ice column (110 mm diameter; 1.2 m height) and a drainpipe (50 mm diameter) inside the ice column. Ice/brine slurry was pumped upwards through the ice column under low pressure using a peristaltic pump. The drainpipe was perforated, to allow brine to flow by gravity to a sump directly underneath the drainpipe. The lower section of the drainpipe had 12 mm holes covered with a 1 mm mesh wire gauze. Due to continuous deposition of ice crystals at the base of the column, the ice column moved to the top where a portion was harvested as product. The feed line to the ice column was provided with a pressure gauge to monitor pressure. Pressure build-up was an indication of excessive ice accumulation in the separator instead of normal upward ice movement in the ice column.

Analytical

Samples were collected at various stages in the treatment process, filtered (Whatman No. 1) and analysed for pH, conductivity, acidity, $Mg^{2+}$, Al(III) and $SO_4^{2-}$ using standard procedures as described in American Public Health Association, APHA 2012, Standard methods for the examination of water and wastewater, 22$^{nd}$, Washington: American Water Works Association, Water Environment Federation. A calibrated Knick Stratos Eco 2505 meter was used to measure electrical conductivity. Ice content was determined by mixing 250 mL ice slurry (mass $m_1$; temperature $T_1$) with 200 mL ($m_2$) warm water ($T_2$). The mass of ice ($m_i$) was determined from $m_1$, $T_1$, $m_2$, $T_2$ and the temperature ($T_3$) was measured after the ice had melted. Microsoft Excel Goal Seek was used to calculate $m_i$ using the following equation:

$$4.18(m_1-m_i)(T_1-T_3)+330m_i+4.18m_2(T_2-T_3)=0 \qquad (1)$$

Results and Discussion

Process Configuration

Software was used to predict the behaviour of copper leachate (1 000 000 mg $H_2O$=1 L $H_2O$), containing 8 520 mg $Mg^{2+}$, 510 mg $Ca^{2+}$, 86.6 mg $Cu^{2+}$, 509.5 mg $Fe^{2+,\ 509.2}$ mg $Fe^{3+}$, 13 538 mg $Al^{3+}$ and 109 408 g $SO_4^{2-}$. This was treated by freeze crystallization and MgO. Table 12 shows the chemical composition of the feed water and after treatment for, (i) removal of water via freeze crystallization for recovery of water and $Al_2SO_4.16H_2O$ and (ii) chemical treatment with MgO for removal of impurities ($Cu^{2+}$, $Fe^{2+}$) and recovery of a saturated $MgSO_4$ solution. The chemical composition was expressed in mg in solution and not the conventional mg/L. The reason was because water was removed in addition to chemical compounds.

TABLE 12

Chemical composition of copper leachate before and after treatment by freeze crystallization and MgO dosing (predicted by software)

| Parameter | Copper leachate | Freeze Des 1 | Freeze Des 2 | MgO dosing 1 | MgO dosing 2 | Sludge separation |
|---|---|---|---|---|---|---|
| Chemical dosing | | | | | | |
| MgO | | | | 14 406.9 | 435.8 | |
| Solution | | | | | | |
| pH | 3.4 | 3.3 | 3.0 | 4.5 | 8.9 | 9.0 |
| $H_2O$ (mg) | 1 000 000 | 600 000 | 200 000 | 200 000 | 200 000 | 200 000 |

TABLE 12-continued

Chemical composition of copper leachate before and after treatment by freeze crystallization and MgO dosing (predicted by software)

| Parameter | Water quality (mg) | | | | | |
|---|---|---|---|---|---|---|
| | Copper leachate | Freeze Des 1 | Freeze Des 2 | MgO dosing 1 | MgO dosing 2 | Sludge separation |
| $Al^{3+}$ (mg) | 13 523 | 13 523 | 6 190 | 1.0 | 0 | 0 |
| $Ca^{2+}$ (mg) | 469 | 266 | 49 | 49 | 49 | 49 |
| $Cu^{2+}$ (mg) | 121 | 121 | 121 | 121 | 0 | 0 |
| $Fe^{2+}$ (mg) | 510 | 510 | 510 | 510 | 16 | 16 |
| $Fe^{3+}$ (mg) | 509 | 509 | 509 | 0.5 | 0 | 0 |
| $Mg^{2+}$ (mg) | 8 522 | 8 522 | 8 522 | 17 209 | 17 472 | 17 472 |
| $SO_4^{2-}$ (mg) | 109 600 | 109 113 | 69 326 | 69 326 | 69 326 | 69 326 |
| TDS (mg) | 133 254 | 132 564 | 85 227 | 87 217 | 86 863 | 86 863 |
| TDS (mg/L solution) | 120 092 | 186 943 | 316 445 | 323 833 | 322 519 | 322 519 |
| Mass (mg solution) | 1 133 254 | 732 564 | 285 227 | 287 217 | 286 863 | 286 863 |
| Cations (meq) | 2 277 | 2 267 | 1 441 | 1 441 | 1 441 | 1 441 |
| Anions (meq) | 2 283 | 2 273 | 1 444 | 1 444 | 1 444 | 1 444 |
| Solution | | | | | | |
| $MgSO_4$ (mg) | | | | | 86 535 | 86 798 | 86 798 |
| $MgSO_4$ (mg/L) | | | | | 432 675 | 433 989 | 433 989 |
| Solids | | | | | | |
| Ice (mg) | | 399 779 | 360 474 | 0 | | |
| $Al_2(SO_4)_3 \cdot 16H_2O$ (mg) | | | 85 554 | | | |
| $Al(OH)_3$ (mg) | | | | 17 879 | | |
| $CaSO_4 \cdot 2H_2O$ (mg) | | 1 058 | 1 987 | | | |
| $Cu(OH)_2$ (mg) | | | | | 186 | |
| $Fe(OH)_2$ (mg) | | | | | 795 | |
| $Fe(OH)_3$ (mg) | | | | | 1.0 | |
| Suspended solids (mg/L) | | 1 763 | 437 703 | 89 397 | 4 907 | |

With reference to FIG. 5, it was shown that in the Freeze Desalination 1 step 40% water was removed with no removal of $Al^{3+}$ and $Mg^{2+}$. The low mass of 469 mg $Ca^{2+}$ in the 1 000 000 mg water was reduced to 266 mg in the remaining 600 000 mg water. This was due to the limited solubility of gypsum. In the Freeze Desalination 2 step a further 40% of the water was removed. This resulted in removal of $Al^{3+}$ as the solubility of $Al_2SO_4 \cdot 16H_2O$ at $-1°$ C. was exceeded. $Al^{3+}$ mass in solution was reduced from 13 523 mg to 6 190 mg to produce 85 554 mg $Al_2SO_4 \cdot 16H_2O$. $Ca^{2+}$ mass was further reduced from 266 mg to 49 mg due to gypsum crystallization.

After the Freeze Desalination 2 step a dosage of 14 410 mg MgO was applied to precipitate the remaining $Al^{3+}$ as $Al(OH)_3$ at pH 4.5. This step offered the benefit that $Al^{3+}$ was completely removed. $Al_2(SO_4)_3$ is used as a coagulant in water treatment. $Mg(OH)_2$ can also be converted to $MgSO_4$ by dissolving it in $H_2SO_4$. $MgSO_4$ is a valuable product used in fertilizer manufacturing.

Thereafter, the predominant $MgSO_4$ solution was purified by precipitating $Fe^{2+}$ and $Cu^{2+}$ as hydroxides ($Cu(OH)_2$ (s) and $Fe(OH)_3$ (s)) by dosing 435.8 mg MgO. The remaining solution contained 86 798 mg $MgSO_4$. The original 1 L (1000 000 mg) of water in the 1 133 254 mg copper leachate was reduced to 0.2 L (200 000 mg) of water, representing a $MgSO_4$ concentration of 433 989 mg/L, which is at saturation level. This solution can be sold as is for fertilizer manufacturing.

Freeze Crystallization

Freezing Point and Water Quality

Figure 6:
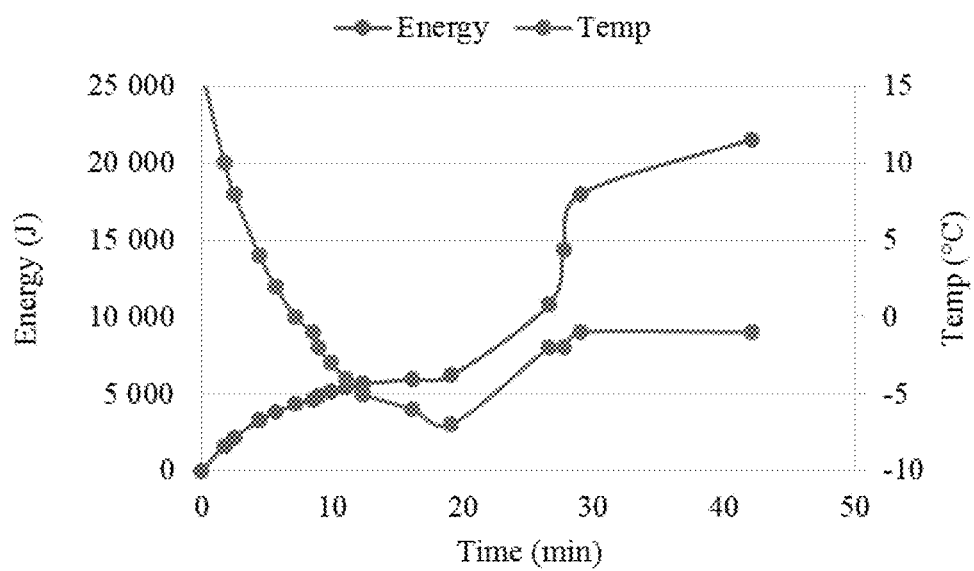
FIG. 6 shows graphs of temperature and energy behaviour over time during cooling of copper leachate to freezing point.

FIG. 6 shows the time needed to reduce the temperature of 64.6 g of water from room temperature (15° C.) to 0° C. and to freezing point and ice formation. In the case of the PVC pipe (20 mm diam. 1.5 mm wall thickness) a time of 7.1 min was needed to lower the temperature from 15° C. to 0° C. A further 12 min was needed to decrease the temperature from 0° C. to $-7°$ C., where after freezing commenced and continued over a period of 23 min. These calculations explain why water is rapidly cooled from room temperature to 0° C. compared to the time needed for freezing the water. The energy usage to freeze the 64.6 g water amounted to 21 576 J.

Ice Production

Ice slurry was produced by passing copper leachate though a PVC pipe, submerged in a water bath at $-8°$ C. and passed through an ice separation system. A filter inside the ice separation system allowed brine to be returned by gravity to a recycle stream while ice was forced to move up the column to be harvested. Over a period of 5 hours operation the conductivity of the melted ice decreased gradually from 27 to 7 mS/m. After harvesting and by allowing the ice to mature further by recirculation, the conductivity decreased to 2 mS/m. The purity of the ice is dependent on crystal growth and recrystallization. By running the plant for a longer period, it is expected that the ice purity will improve further. Table 13 shows that clean ice can be produced. In the copper leachate the TDS content had been reduced from 119 138 mg/L to 2 102 mg/L.

TABLE 13

Water quality of feed, melted ice and brine

| Parameter | Chemical composition | | |
|---|---|---|---|
| | Feed (mg/L) | Ice (mg/L) | Brine (mg/L) |
| Cond. (mS/cm) | 44.0 | 2.5 | 62.0 |
| pH | 3.4 | 3.3 | 3.2 |
| $Al^{3+}$ | 13 500 | 244 | 20 195 |

TABLE 13-continued

Water quality of feed, melted ice and brine

| Parameter | Chemical composition | | |
|---|---|---|---|
| | Feed (mg/L) | Ice (mg/L) | Brine (mg/L) |
| $Mg^{2+}$ | 6 439 | 95 | 9 700 |
| $Fe^{2+}$ | 471 | 19 | 650 |
| $Cu^{2+}$ | 2.5 | 0.0 | 3.7 |
| $Ca^{2+}$ | 21 | 7 | 21 |
| $SO_4^{2-}$ | 98 706 | 1 742 | 147 000 |
| Cations (meq/L) | 2 056 | 36 | 3 078 |
| Anions (meq/L) | 2 056 | 36 | 3 063 |
| TDS (mg/L) | 119 138 | 2 107 | 177 570 |

Feasibility

A cost-effective process configuration was proposed for treatment of copper leachate by using the following approach: (i) use freeze crystallization for recovery of water from a highly saline stream (e.g. as produced by reverse osmosis), (ii) precipitate $Al_2(SO_4)_3.16H_2O$ directly with freeze crystallization for as long as $MgSO_4$ remains in solution, (ii) use MgO to precipitate the last fraction of $Al^{3+}$ in solution (as $Al(OH)_3$) at the stage just before $MgSO_4$ starts to precipitate, (iii) convert the $Mg(OH)_2$ with $H_2SO_4$ to $MgSO_4$, and (iv) use the saturated $MgSO_4$-solution as a final product.

The feasibility of processing copper leachate is calculated in and demonstrated by the results in Tables 14-17. Electricity cost amounted to R50.07/m³ (Table 14); capital cost to R27.3 million for a 68.1 m³/h plant (Table 15); chemical cost to R141.59/m³ (Table 16); capital redemption cost to R7.88/m³ (Table 17), and the value of water and products ($Al_2(SO_4)_3.16H_2O$ and $MgSO_4$) to R550.37/m³ (Table 16). The combined value of products clearly exceeds the costs by R343.05/m³ (Table 18).

TABLE 14

Energy cost

| Parameter | Value |
|---|---|
| Plant capacity (kg/s) | 18.92 |
| Electricity usage (80% ice recovery; COP = 1.5; 80% efficiency) (kW) | 4 871.36 |
| Electricity usage (kWh/m³) | 71.53 |
| Electricity price (R/kWh) | 0.70 |
| Electricity cost (R/m³) | 50.07 |

TABLE 15

Capital cost

| Cost items | Value |
|---|---|
| Plant capacity (m³/h) | 68.10 |
| Plant capacity (gal/min) | 300.00 |
| Chiller capacity (MW) | 4.87 |
| Capital cost: Chiller (R/MW) | 2 800 000 |
| Capital cost: Chiller (R) | 13 639 803 |
| Capital cost: Other (R) | 13 639 803 |
| Total Capital cost (R) | 27 279 607 |

TABLE 16

Cost of raw materials and value of products

| Chemical | Usage kg/m³ | Price R/t | Cost/Value R/m³ |
|---|---|---|---|
| Raw materials | | | |
| MgO | 13.10 | 4 000 | −52.39 |
| $H_2SO_4$ | 29.73 | 3 000 | −89.20 |
| Total cost | | | −141.59 |
| Products | | | |
| $Al_2(SO_4)_3.16H_2O$ | 139.21 | 2 000 | 278.42 |
| $MgSO_4.7H_2O$ | 156.81 | 1 700 | 266.58 |
| Water | 670.86 | 8 | 5.37 |
| Total value | | | 550.37 |

TABLE 17

Feasibility

| Cost item | Value |
|---|---|
| Capital redemption cost (R/m³) (1%/month; 120 month) | −7.88 |
| Electricity cost (R/m³) | −50.07 |
| Labour (R/m³) (10 operators; R7000/Month) | −1.41 |
| Maintenance (R/m³) (3% of Capital cost) | −1.37 |
| Other (R/m³) | −5.00 |
| Chemical cost (R/m³) | −141.59 |
| Total cost (R/m³) | −207.32 |
| Value of products (R/m³) | 550.37 |
| Profit (R/m³) | 343.05 |

The following conclusions were drawn from the results of this study:
1. With software it was predicted that from 1 113 254 mg copper leachate (1000 000 mg $H_2O$+133 254 mg salt) the following can be recovered: (i) 399 799 mg ice in Step 1 (Freeze Desalination 1), (ii) 360 474 mg ice, 85 554 mg $Al_2(SO_4)_3.16H_2O$ and 1987 mg gypsum in Step 2 (Freeze Desalination 2), (iii) 17 879 mg $Al(OH)_3$ in Step 3 (MgO 1), (iv) 186 mg $Cu(OH)_2$ and 795 mg $Fe(OH)_2$ in Step 4 (MgO 2) and (v) 86 798 mg $MgSO_4$ (200 mL of a 43% $MgSO_4$ solution) in Step 5 (Final brine).
2. Pure ice with a TDS of 2 107 mg/L was recovered in a laboratory freeze crystallization unit from copper leachate with a TDS of 119 135 mg/L. The TDS of the brine increased to 177 570 mg/L.
3. The total combined running and capital redemption costs were estimated at R207.32/m³.
4. The total value of water and products ($Al_2(SO_4)_3.16H_2O$ and $MgSO_4$) were estimated at R550.37/m³.
5. This technology is an improvement on existing desalination technology for the following reasons: (i) it decreases brine volumes by crystallization of dissolved species enabling further water recovery, and (ii) it reduces sludge formation by enabling the selective production of saleable products.

Figure 7:
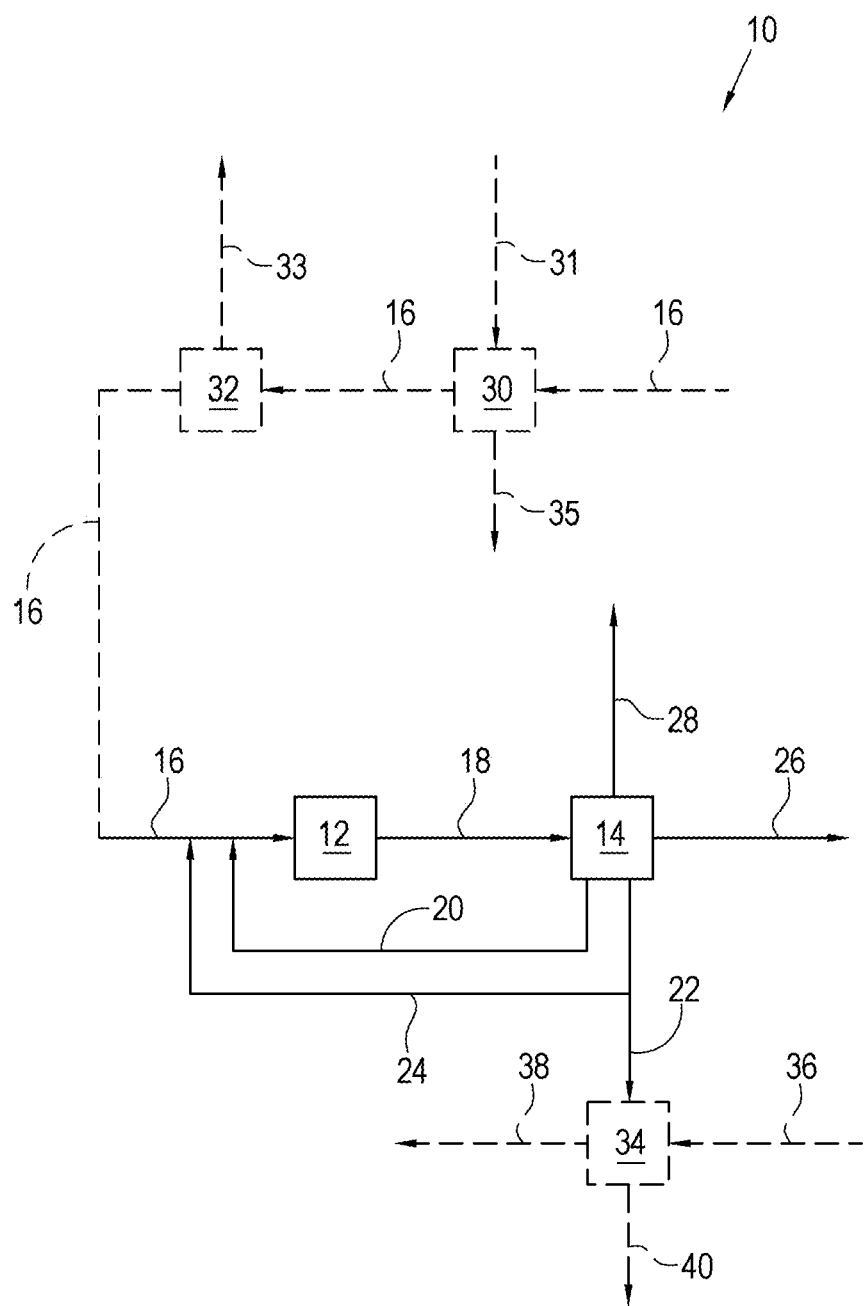
FIG. 7 shows one embodiment of a water treatment process in accordance with the invention.

Referring to FIG. 7 of the drawings, reference numeral 10 generally indicates one embodiment of a water treatment process in accordance with the invention. The process 10 broadly includes a crystallisation stage 12 and a separation stage 14. A saline water feed line 16 leads to the crystallisation stage 12 and a brine and ice slurry line 18 leads from the crystallisation stage 12 to the separation stage 14.

Four lines lead from the separation stage 14. A brine and ice recirculation line 20 leads from the separation stage 14 back to the crystallisation stage 12. A concentrated brine line 22 is provided to withdraw concentrated brine from the separation stage 14. A concentrated brine recycle line 24 splits off from the concentrated brine line 22 and returns to the crystallisation stage 12. The separation stage 14 is further provided with an ice withdrawal line 26 and a salt crystal withdrawal line 28.

In the process 10, a saline water feed is fed by means of the saline water feed line 16 to the crystallisation stage 12. The crystallisation stage 12, in the embodiment illustrated, includes a water bath holding a heat transfer medium in the form of a 30% methanol and water mixture, at a temperature of between −8° C. and −10° C. Within the water bath, an elongate coiled conduit (or a plurality of such conduits) of a material with a thermal conductivity of less than about 5 W/m·K is submerged in the water bath. The elongate conduit in the embodiment illustrated is a coiled PVC conduit. The saline water feed is fed through the PVC conduit submerged in the water bath to form a slurry of brine and ice crystals inside the conduit, as a result of the exchange of heat with the cold heat transfer fluid in the water bath.

In the embodiment shown in FIG. 7, the PVC conduit has an outer diameter of 20 mm, a length of 181 m and a wall thickness of 3 mm. PVC has a thermal conductivity of about 0.19 W/m·K. An inlet velocity of the saline water feed into the elongate PVC conduit is about 1.2 m/s.

The PVC conduit (material, diameter and wall thickness), the rate of passing of saline water through the PVC conduit, an inlet temperature of the saline water feed to the PVC conduit, and the temperature of the water bath are configured or selected such that heat is transferred from the saline water feed inside the PVC conduit to the water bath through the wall of the PVC conduit, at a rate such that the overall heat transfer coefficient is less than about 100 W/(m²·K) but at least about 20 W/(m²·K), e.g. between about 40 and about 80 W/(m²·K).

Advantageously, as a result of the use of a material with a low thermal conductivity, such as PVC, leading to a low rate of heat transfer from the saline water feed to the water bath, ice does not scale interior surfaces of the elongate conduit. The use of scrapers to clear away ice from inner surfaces of the elongate conduit is thus not required. Such a low rate of heat transfer however requires an unusually long conduit for heat transfer purposes.

As will be appreciated, a means is required to maintain the low temperature of the water bath. Typically, thus, the process 10 employs a chiller unit or the like to maintain the temperature of the heat transfer medium in the water bath at a suitably low value. The chiller unit can act directly on the heat transfer medium to cool the heat transfer medium, or a secondary heat transfer medium may be employed, transferring heat from the water and methanol heat transfer medium in the water bath to the chiller unit for rejection to the atmosphere.

The brine and ice slurry formed inside the elongate conduit comprises about 40% to about 50% by mass of ice. The brine and ice slurry is withdrawn from the crystallisation stage 12 by means of the brine and ice slurry line 18 and fed to the separation stage 14. In the separation stage 14, the brine and ice slurry, which is typically saturated with one or more salts, is separated into a concentrated brine which is withdrawn by means of the concentrated brine line 22, ice, which is withdrawn by means of the ice withdrawal line 26, and salt crystals which are withdrawn by means of the salt crystal withdrawal line 28.

In the embodiment of the invention shown in FIG. 7, brine and ice (about 15% by mass ice) from the separation stage 14 are recirculated by means of the brine and ice recirculation line 20 to the crystallisation stage 12. The recycled ice serves to provide seed ice crystals for ice crystal growth. The brine and ice recirculated to the crystallisation stage 12 may also include salt crystals (e.g. $MgSO_4 \cdot 7H_2O$ and/or $Na_2SO_4 \cdot 10H_2O$ and/or $Al_2(SO_4)_3 \cdot 16H_2O$), which advantageously can act as seed crystals for salt crystal growth inside the elongate PVC conduit of the crystallisation stage 12.

A portion of the concentrated brine from the separation stage 14 is recycled by means of the concentrated brine recycle line 24 to the crystallisation stage 12.

Separating ice and brine in the separation stage 14, in one embodiment of the invention, comprises discharging an ice and brine stream (comprising about 50% by mass ice) onto a belt filter. Typically, the belt filter moves relatively slowly, with a retention time of ice on the belt filter being about 60 minutes. Preferably, the belt filter is insulated to inhibit heat loss to the environment, and if desired, a vacuum may be applied to the belt filter to facilitate separation of ice and brine. The belt filter is thus typically housed within an insulated housing so that the temperature inside the housing is maintained in the range of about 0° C. to about 10° C., allowing some melting of ice crystals to take place, with melt water produced by the melting of the ice crystals advantageously washing the ice crystals on the belt filter, thus increasing the purity of any water eventually obtained from the ice crystals.

In the separation stage 14, salt crystals are also separated from concentrated brine. Typically, this is also effected by way of filtration, e.g. using a belt filter onto which concentrated brine containing salt crystals is discharged. Again, if desired, a vacuum, may be applied to the belt filter to facilitate separation of the salt crystals from the concentrated brine.

As shown in FIG. 7 of the drawings, the process 10 may include a precipitation stage 30 and a reverse osmosis stage 32, with the saline water thus, in an embodiment of the process of the invention which employs a precipitation stage 30 and a reverse osmosis stage 32, first being fed to the precipitation stage 30. In the precipitation stage 30, the saline water, which may be acidic, e.g. in the case of acid mine drainage or a copper leachate, is dosed with an alkali (e.g. $Na_2CO_3$, NaOH, $Mg(OH)_2$, MgO KOH or $NH_4OH$) by means of an alkali dosing line 31, gradually increasing the pH of the saline water so that different metals can be removed at different pH, as represented by a precipitated metal removal line 35. Thus, $Fe^{3+}$ can be precipitated at a pH of about 3 as $Fe(OH)_3$, $Al^{3+}$ can be precipitated at a pH of about 4.3 as $Al(OH)_3$, $CaCO_3$ can be precipitated at a pH of about 4 if $Ca^{2+}$ is present in the saline water and if $Na_2CO_3$ is used as the alkali or if $HCO_3^-$ is present in the saline water feed and $OH^-$ is added with the alkali. $Cu(OH)_2$ can be precipitated at a pH of about 7 to 8. The $Fe(OH)_3$ can advantageously be converted to pigment through heat treatment. $Al(OH)_3$ is saleable as is but advantageously can also be reacted with $H_2SO_4$ to produce saleable $Al_2(SO_4)_3 \cdot 16H_2O(s)$, which is valuable for use as a coagulant in water treatment.

Saline water from which metals have been precipitated is then fed to the reverse osmosis stage 32 in which a conventional reverse osmosis process, or a reverse osmosis process as described in WO 2017/191494 A1, is used to remove salt from the saline water, producing a brine. Clean water is removed from the reverse osmosis stage 32 by means of a clean water withdrawal line 33 and the brine is removed from the reverse osmosis stage 32 by means of the saline water feed line 16, the brine removed from the reverse osmosis stage 32 becoming the saline water feed to the crystallisation stage 12.

Alternatively to removing metals by means of the precipitation stage 30 upstream of the crystallisation stage 12, metals can be removed from the concentrated brine in the concentrated brine line 22, as illustrated by the optional precipitation stage 34 shown in FIG. 7. The precipitation stage 34 is thus provided with an alkali feed line 36 and a precipitated metals removal line 38, as well as a brine disposal line 40. Metals precipitation in the precipitation stage 34 can be effected in the same way as discussed hereinbefore for the metals precipitation stage 30. Advantageously however, if metals removal is effected in the precipitation stage 34, i.e. downstream of the separation stage 14, metals concentration is increased and smaller volumes of water or brine need to be treated for recovery of saleable products such as pigment, $Al(OH)_3$ and $CaCO_3$.

In one embodiment of the invention, the process 10 includes the precipitation stage 30 but omits the reverse osmosis stage 32.

Figure 8:
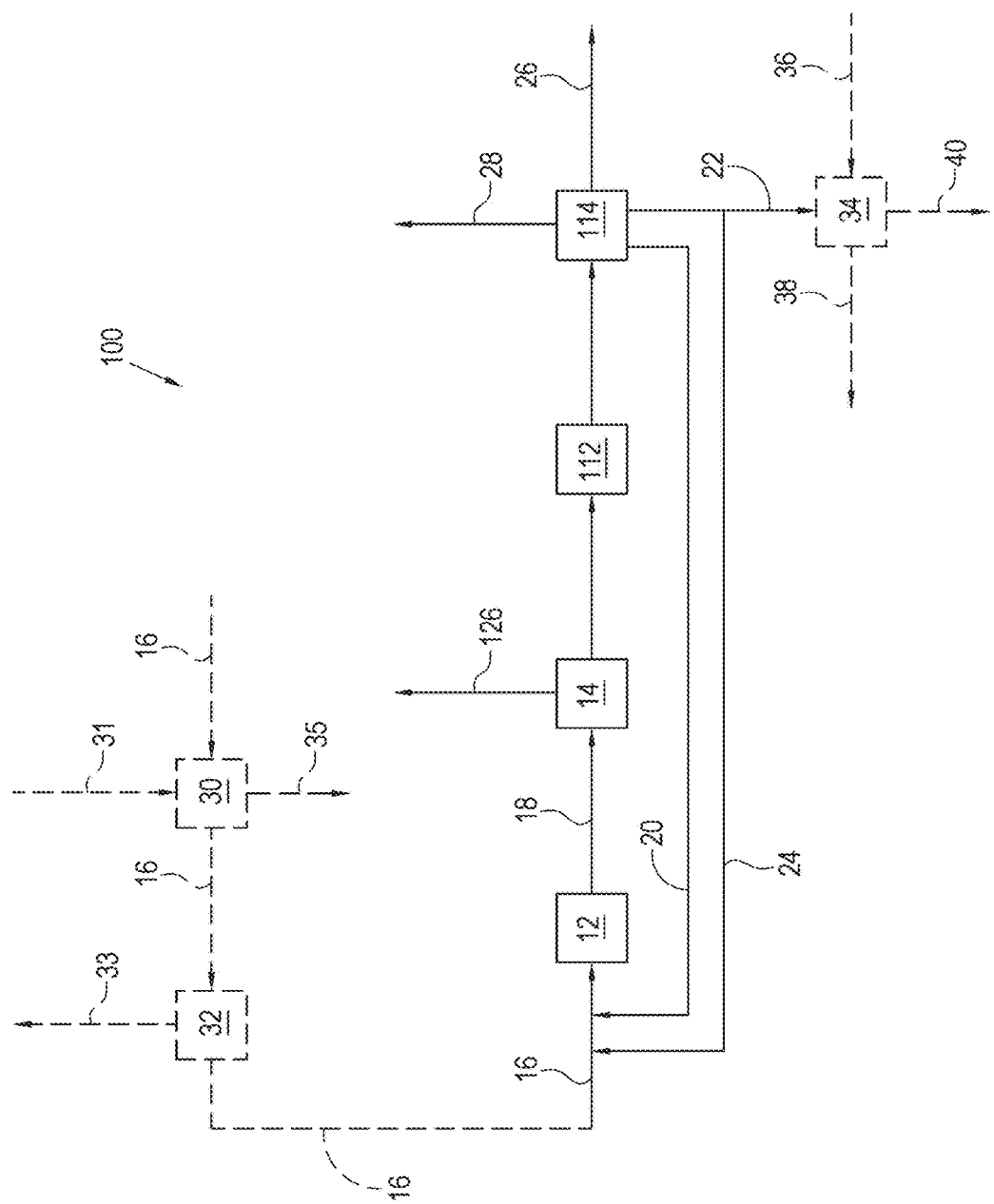
FIG. 8 shows another embodiment of a water treatment process in accordance with the invention.

Referring to FIG. 8 of the drawings, reference numeral 100 indicates another water treatment process in accordance with the invention. The process 100 is similar to the process 10, and unless otherwise indicated, the same reference numerals are used to indicate the same or similar process features.

Unlike the process 10, the process 100 employs a second crystallisation stage 112 in addition to the first crystallisation stage 12, and a second separation stage 114 in addition to the first separation stage 14. The second crystallisation stage 112 is in flow communication with the first separation stage 14 to receive brine from the first separation stage 14 as a saline water stream or feed.

In the process 100, a slurry of ice and brine is formed in the elongate PVC conduit of the first crystallisation stage 12, as described for the process 10. The formation of salt crystals is however avoided by ensuring that the salt concentration does not exceed the solubility of the salt in the brine in the first crystallisation stage 12. In other words, ice formation, and hence water removal from the brine, must be kept low enough to ensure that the salt concentration in the brine in the first crystallisation stage 12 does not exceed the solubility of the salt in the brine.

In the first separation stage 14, ice is separated from the brine and withdrawn by means of an ice withdrawal line 126. Concentrated brine from the first separation stage 14 is fed as a saline water feed to the second crystallisation stage 112, which also comprises an elongate PVC conduit submerged in a water bath, and which is operated in the same fashion as the first separation stage 12. In the second crystallisation stage 112, the concentration of the salt in the brine is increased further, as a result of removal of water as ice from the brine, leading to salt crystal formation once the salt concentration exceeds the solubility of the salt in the brine in the second crystallisation stage 112. Ice and brine from the second crystallisation stage 112 are then fed to the second separation stage 114, which is operated in the same fashion as the separation stage 14 of the process 10.

By way of the process 100, a copper leachate, for example, can be treated to produce ice from the first crystallisation stage 12, without producing salt crystals, and to produce ice, brine and precipitated $Al_2(SO_4)_3.16H_2O$ from the second crystallisation stage 112.

Optionally, the process 100 may include one or more precipitation stages between the separation stage 14 and the second crystallisation stage 112, in which, by means of alkali addition and pH control, metals such as Ca and Fe are selectively precipitated (e.g. as $CaCO_3$ and $Fe(OH)_3$) at different pH levels, e.g. by replacing the metals in solution with Na or Mg.

Figure 9:
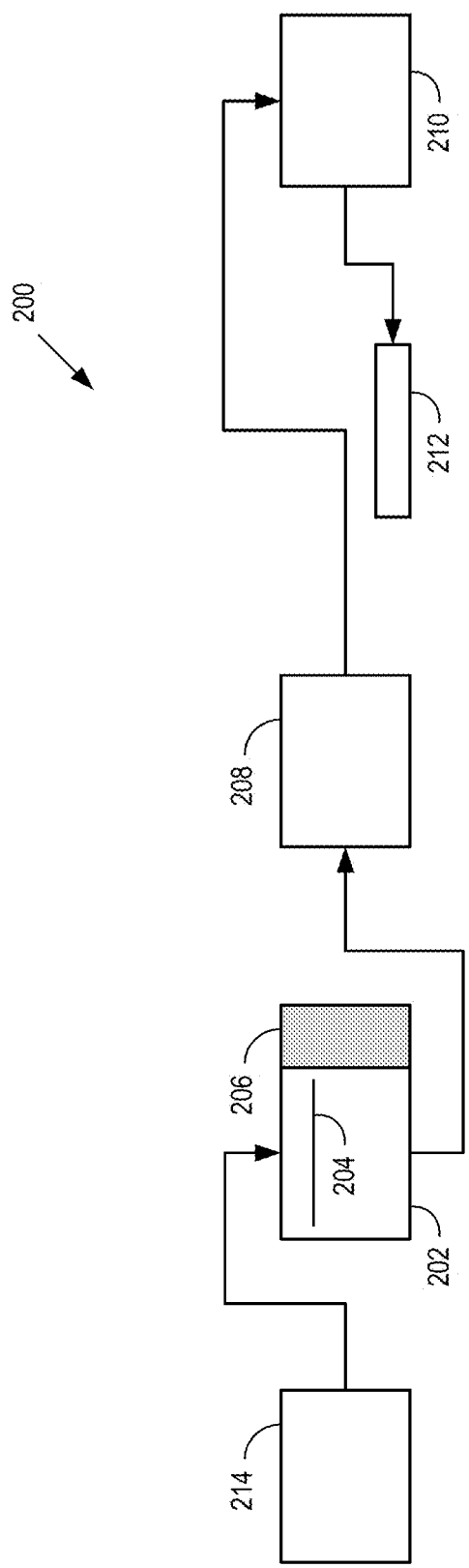
FIG. 9 shows one embodiment of a layout of apparatus or a plant embodying the water treatment process in accordance with the invention, with some components not being shown.
Figure 10:
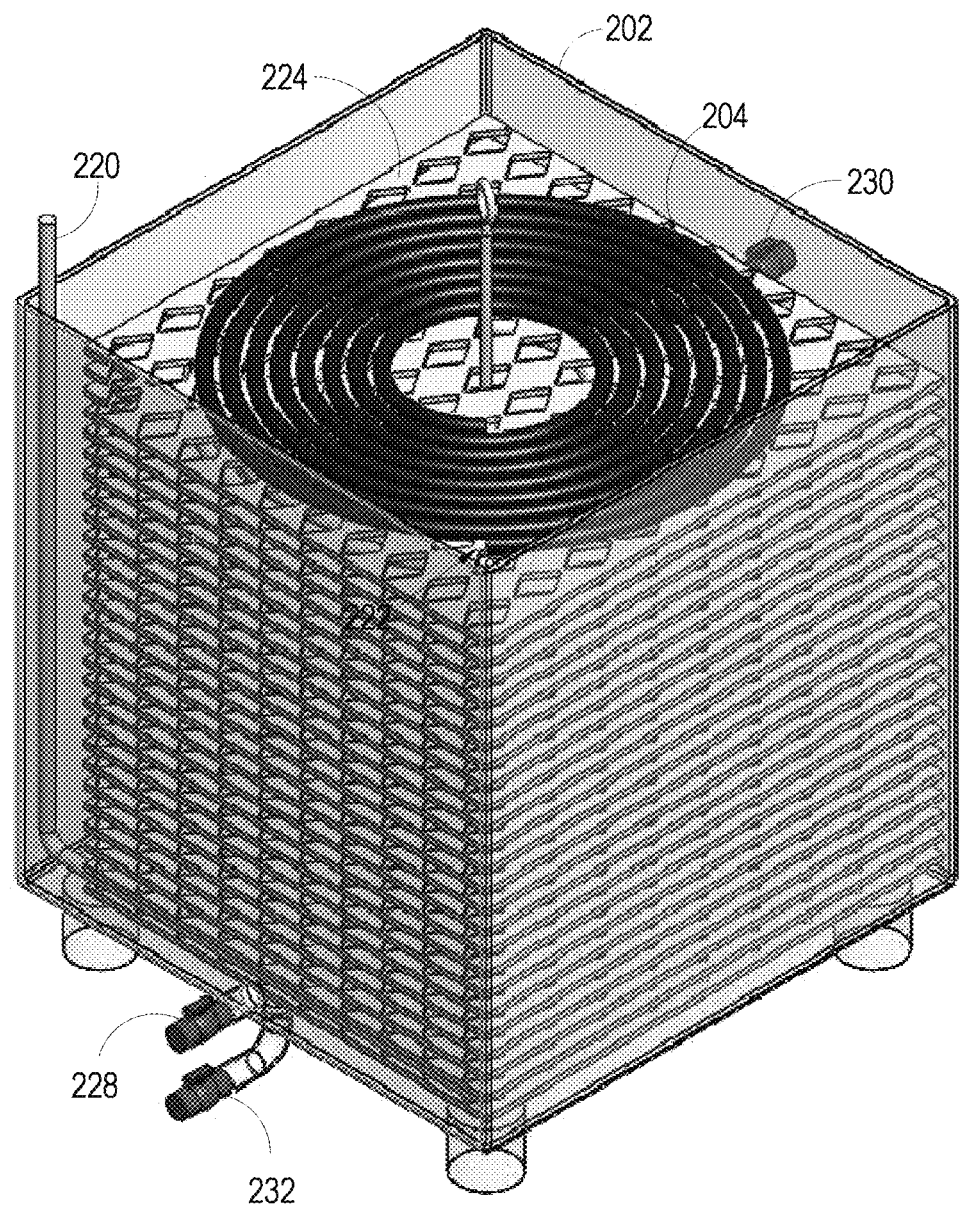
FIG. 10 shows one embodiment of a freeze reactor forming part of the water treatment apparatus in accordance with the invention.

FIG. 9 shows a diagram of one embodiment of the layout of apparatus or a plant to treat a saline water feed in accordance with the process of the invention. In FIG. 10, many features are omitted, with only some of the important basic components or unit operations being shown. The plant or apparatus is generally indicated by reference numeral 200.

The plant or apparatus 200 includes a crystallisation stage (i.e. a freeze reactor) comprising a water bath 202 filled with a 30% by mass methanol and water mixture as a heat transfer medium, and an elongate PVC conduit 204 which is submerged under the heat transfer medium. A chiller 206 is provided to maintain the temperature of the heat transfer medium in the water bath 202 in the range of about $-8°$ C. to $-10°$ C.

A separation stage of the plant or apparatus 200 includes a separator 208 and a belt filter 210. The separator 208 is configured to separate a slurry of brine and ice received from the elongate PVC conduit 204 into and ice and brine stream withdrawn from immediately below a conical hood and a salt and brine stream withdrawn by means of an outlet formed in a conical bottom on which precipitated salt collects.

The ice and brine stream from the separator 208 is transferred (e.g. by means of a positive displacement pump such as a peristaltic pump) to the belt filter 210, on which the ice is separated from brine. Brine separated from the ice on the belt filter 210 is collected in a sump 212. Similarly, the salt and brine stream can also be separated in a filter. The concentrated brine from the separator 208 is also collected in the sump 212, from where a portion of the collected brine can be recycled to the inlet of the elongate PVC conduit 204 in the water bath 202. A single recycle pump with a manifold can be used to recycle brine, even when more than one elongate conduit is used in the water bath 202 of the crystallisation stage.

A feed tank 214 is provided to collect saline water feed, e.g. produced by a reverse osmosis process, for feeding to the inlet of the elongate PVC conduit 204 in the water bath 202.

Figure 11:
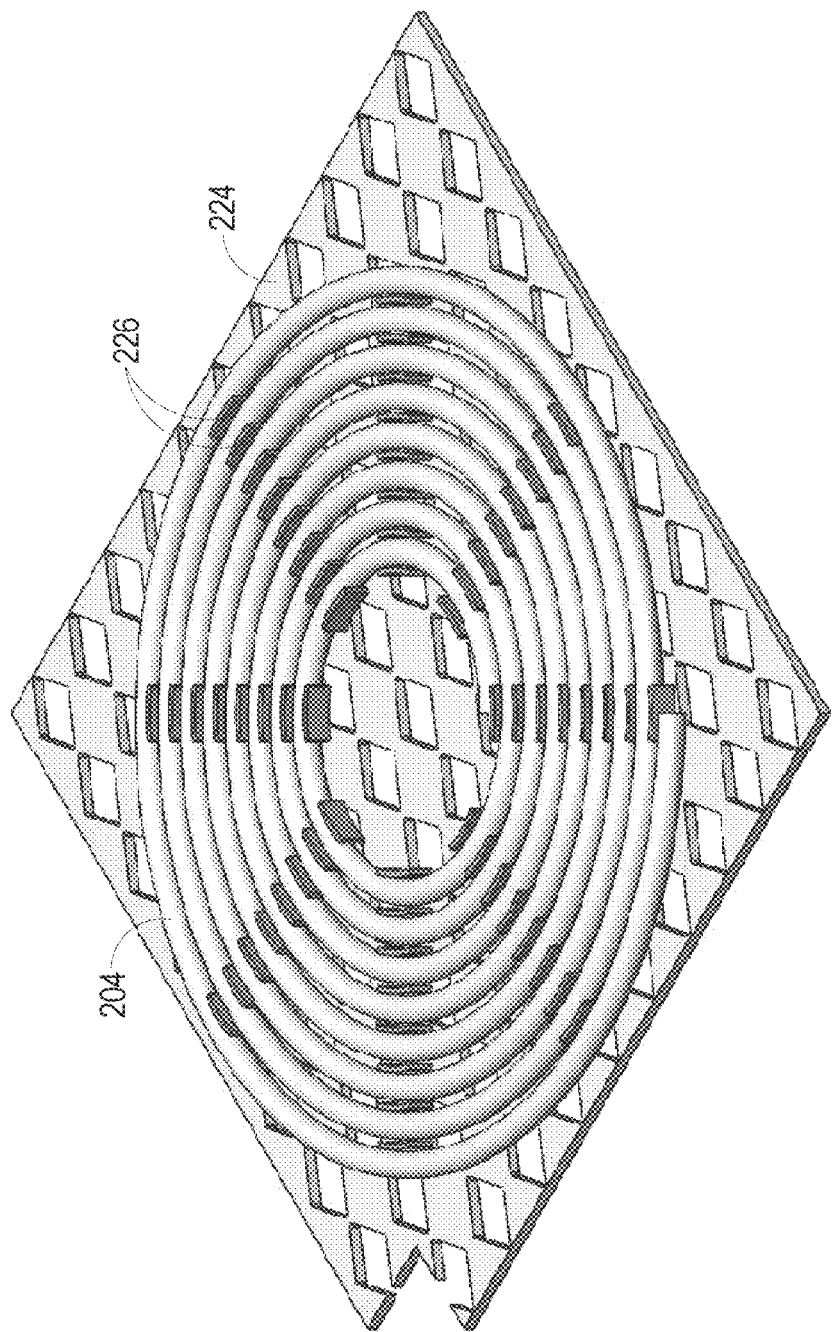
FIG. 11 shows some detail of the freeze reactor of FIG. 10.
Figure 12:
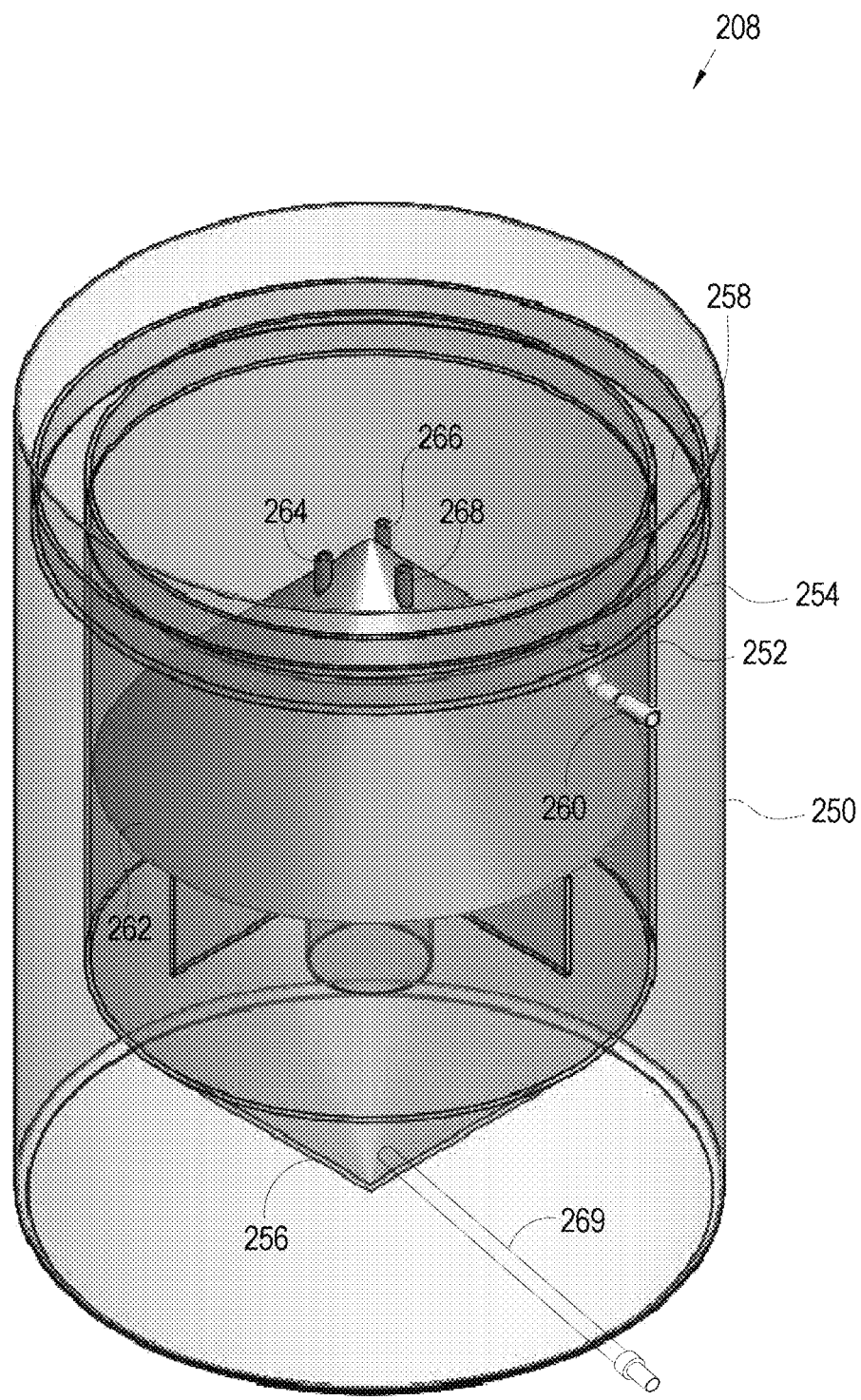
FIG. 12 shows a three-dimensional view of one embodiment of a separator forming part of the water treatment apparatus in accordance with the invention.

With reference to FIG. 11, more detail of the arrangement of the water bath 202 and the elongate PVC conduit 204 is shown. As can be seen, the elongate PVC conduit 204, which has an outer diameter of 20 mm, a wall thickness of 3 mm and a length of between 50 m and 400 m, e.g. 181 m, is shown. The PVC conduit 204 has a thermal conductivity of 0.19 W/m·K and is arranged in a coil which extends in a vertical direction, with an inlet 220 at a bottom of the coil and an outlet 222 at a top of the coil (the outlet 222 will of course be routed over or through a wall of the water bath 202). The coil is in the form of layers of PVC conduit that are vertically stacked, each layer being in the form of a spiral in a plane winding and supported on a perforated support grid 224. As shown in FIG. 12 of the drawings, spacers 226 are provided to separate each winding of the conduit 204 in a plane winding.

The PVC conduit 204 of each plane winding or spiral layer passes through one of the apertures in the support grid 224 supporting a winding or layer immediately above it so that a spiral layer with an inlet at an outer end of the spiral is immediately below or immediately above a spiral layer with an inlet at an inner end of the spiral, and vice versa.

The water bath 202 has an inlet 228 to receive chilled heat transfer medium from the chiller 206, and an outlet 230 for transferring heat transfer medium from the water bath 202 to the chiller 206 for cooling. A drain 232 is also provided at a bottom of the water bath 202.

Figure 13:
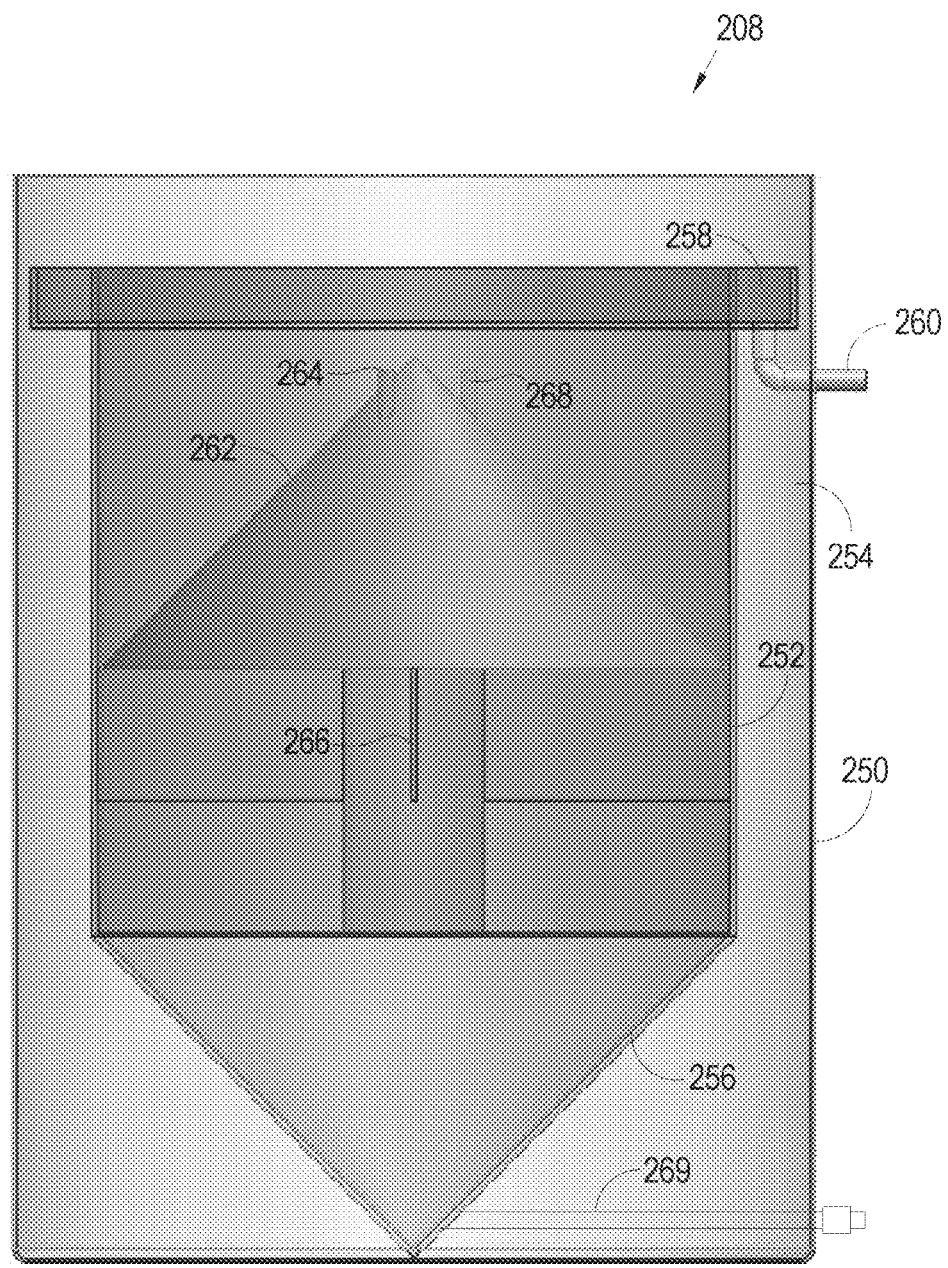
FIG. 13 shows a vertical section through the separator of FIG. 12.

More detail of the separator 208 can be seen in FIGS. 13 and 14 of the drawings. The separator 208 includes an outer vessel 250 within which a separation vessel 252 is located. Between the separation vessel 252 and the outer vessel 250 there is a volume 254 filled by a heat transfer medium which thus at least partially surrounds or submerges the separation vessel 252. The separation vessel 252 is thus held in a water bath to inhibit heat loss from slurry or brine and ice crystals fed into the separation vessel 252. Advantageously, the same heat transfer fluid used in the water bath 202 may be used in the separator 208.

The separation vessel 252 has a conical bottom 256 and an overflow weir 258 with an outlet 260.

A conical hood 262 is provided inside the separation vessel 252, with an apex of the conical hood 262 being below the overflow level of the weir 258 so that, in use, the conical hood 262 is submerged by brine. A small annular gap is provided between the conical hood 262 and an inner surface of the separation vessel 252 so that brine can pass upwards through the gap, but with most, preferably all ice crystals being trapped below the conical hood 262.

The separator 208 has an inlet 264 through which a slurry of brine and ice, from the elongate PVC conduit 204, can be fed to be discharged below the conical hood 262. A brine and ice recycle outlet 266 also extends from below through the conical hood 262. By means of the brine and ice recycle outlet 266, brine and ice from below the conical hood 262, at about half of the height of the separation vessel 252 can be withdrawn and recycled to the inlet of the elongate conduit 204. Preferably, an elevation of a bottom inlet of the brine and ice recycle outlet 266, below the conical hood 262, is adjustable, so as to allow manipulation of the concentration of ice crystals and/or the concentration of salt crystals recycled to the inlet of the elongate conduit 204.

The separator 208 has a salt crystal outlet 269 extending from the conical bottom 256 through the outer vessel 250. The salt crystal outlet 269 is used to withdraw (e.g. by means of a positive displacement pump such as a peristaltic pump) precipitated salt crystals, in the form of concentrated brine containing about 20% by mass salt crystals) that are collected on the conical bottom 256.

An ice and brine outlet 268 extends upwardly from the conical hood 262 and is used to withdraw (e.g. by means of a positive displacement pump such as a peristaltic pump) a slurry of ice and brine from the separation vessel 252, from below the conical hood 262.

In use, a slurry of ice and brine, typically comprising between about 40% and about 50% by mass of ice crystals, is fed by means of the inlet 264 into the separation vessel 252, and is discharged below the conical hood 262. As a result of density difference, the ice rises and attempts to float and is collected below the conical hood 262. Brine is allowed to pass through the annular aperture between the conical hood 262 and the inner surface of the separation vessel 252, and overflows into the weir 258, from where it is withdrawn by means of the outlet 260. A slurry of ice and brine (typically with about 50% by mass ice) is withdrawn through the outlet 268 and is fed to the belt filter 210.

Precipitated salt crystals collected on the conical bottom 256 are withdrawn by means of the salt crystal outlet 269 and typically also fed to a belt filter for separation of brine from the salt crystals. As mentioned hereinbefore, a slurry of brine and ice for recycling purposes is withdrawn by means of the outlet 266 and returned to the inlet of the elongate PVC conduit 204.

By means of the invention, as illustrated, freeze crystallisation can be used to purify saline water without the need for expensive scraped surface heat exchangers. By using freeze desalination in combination with an upstream desalination process such as reverse osmosis or reverse osmosis combined with cooling and salt precipitation/removal, a process is provided which is attractive from a cost perspective and which can yield valuable saleable products (thus reducing sludge requiring disposal) and clean water from a saline feed stream such as acid mine drainage or a copper leachate.

The invention claimed is:

1. A water treatment process that comprises
    in a crystallisation stage, passing a saline water feed through an elongate conduit kept in a cold environment at a temperature below the equilibrium freezing temperature of the saline water, thereby forming a slurry of brine and ice crystals inside the conduit; and
    in a separation stage, separating the ice crystals from a bulk of the brine, producing a brine stream and an ice stream,
    the elongate conduit being of a material, or having an inner material layer in contact with the saline water and with the slurry of brine and ice crystals, with a thermal conductivity of less than 5 W/m·K and having a length of at least 50 m.

2. The water treatment process according to claim 1, wherein the thermal conductivity of the material or material layer is less than 3 W/m·K.

3. The water treatment process according to claim 1, wherein an inlet velocity of the saline water feed in the elongate conduit is between 0.1 m/s and 4.0 m/s and/or wherein the elongate conduit has a length of at least 70 m.

4. The water treatment process according to claim 1, wherein the elongate conduit has an outer diameter of between 10 mm and 90 mm and/or wherein the elongate conduit has a wall thickness of between 1.5 mm and 6.7 mm.

5. The water treatment process according to claim 1, wherein the elongate conduit is of a synthetic plastics or polymeric material, and/or wherein the conduit is coiled with the coiled conduit extending in a vertical direction, with an inlet at a bottom of the coil and an outlet at a top of the coil.

6. The water treatment process according to claim 1, wherein the elongate conduit, the rate of passing of saline water through the elongate conduit, a temperature of the saline water feed to the elongate conduit, and the temperature and nature of the cold environment are configured or selected such that heat is transferred from the saline water inside the elongate conduit to the cold environment through the wall of the elongate conduit, at a rate given by the formula q=UAΔT, where q is heat transfer in W, U is the overall heat transfer coefficient in W/(m²·K), A is the outer surface area of the elongate conduit in m² and ΔT is the temperature difference in kelvin between saline water fed into the elongate conduit and the cold environment, such that U is less than 300 W/(m²·K).

7. The water treatment process according to claim 1, wherein the rate of passing of saline water through the elongate conduit, the temperature of the saline water feed to the elongate conduit, the temperature of the cold environment and the length of the elongate conduit are selected such that the slurry of brine and ice crystals formed inside the elongate conduit comprises between 10% by mass and 60% by mass ice.

8. The water treatment process according to claim 1, wherein separating the ice crystals from a bulk of the brine comprises feeding the slurry of brine and ice crystals into a separator of the separation stage, in which separator ice crystals are allowed to rise as a result of the density difference between ice and brine, forming an ice and brine body in contact with concentrated brine;

withdrawing ice and brine from the ice and brine body in the separator; and withdrawing concentrated brine from the separator.

9. The water treatment process according to claim 8, wherein the concentrated brine withdrawn from the separator comprises precipitated salt, the process comprising separating salt crystals from the concentrated brine withdrawn from the separator.

10. The water treatment process according to claim 8, which comprises recycling brine and ice from the separator to the saline water feed to the elongate conduit, or which comprises, in the separation stage, using a belt filter to separate the ice and the brine of a stream of ice and brine withdrawn from the ice and brine body in the separator, the belt filter being housed within an insulated housing with the temperature inside the housing being maintained in the range of −5° C. to 10° C.

11. The water treatment process according to claim 1, wherein the crystallisation stage is a first crystallisation stage and the separation stage is a first separation stage, the process employing a second crystallisation stage in flow communication with the first separation stage to receive the brine stream from the first separation stage as a saline water stream, and a second separation stage, the process comprising forming another slurry of brine and ice crystals inside a conduit of the second crystallisation stage, and separating with the ice crystals formed inside the conduit of the second crystallisation stage from a bulk of the brine in the second separation stage, thereby producing a brine stream and a further ice stream.

12. The water treatment process according to claim 1, wherein the saline water feed is brine from a final membrane separation stage of a reverse osmosis process to remove salt from saline water, or wherein the saline water feed is brine from a final membrane separation stage of a process to remove salt from saline water that employs at least two membrane separation stages in series with an intervening salt precipitation step at a lowered temperature, and/or which comprises, prior to the crystallisation stage, removing metals from the saline water feed, and/or which comprises removing metals from a discharge stream of concentrated brine, and/or which comprises concentrating a discharge stream of concentrated brine to recover salts.

* * * * *